(12) United States Patent
Motosugi

(10) Patent No.: US 9,778,704 B2
(45) Date of Patent: Oct. 3, 2017

(54) BIAXIAL HINGE AND TERMINAL DEVICE USING THE SAME

(71) Applicant: KEM HONGKONG LIMITED, Tsimshatsui Kowloon (HK)

(72) Inventor: Hideki Motosugi, Kanagawa (JP)

(73) Assignee: KEM HONGKONG LIMITED, Tsimshatsui Kowloon (HK)

( * ) Notice: Subject to any disclaimer, the term of this patent is extended or adjusted under 35 U.S.C. 154(b) by 193 days.

(21) Appl. No.: 14/604,244

(22) Filed: Jan. 23, 2015

(65) Prior Publication Data

US 2015/0227175 A1 Aug. 13, 2015

(30) Foreign Application Priority Data

Feb. 7, 2014 (JP) ................................ 2014-022109

(51) Int. Cl.
*E05D 3/06* (2006.01)
*G06F 1/16* (2006.01)

(52) U.S. Cl.
CPC .......... *G06F 1/1681* (2013.01); *G06F 1/1618* (2013.01); *Y10T 16/54035* (2015.01)

(58) Field of Classification Search
CPC .... G06F 1/1681; G06F 1/1618; G06F 1/1616; G06F 1/1679; Y10T 16/54035; Y10T 16/547; Y10T 16/5478; Y10T 16/53824; Y10T 16/53825; Y10T 16/53832; Y10T 16/53843; Y10T 16/53864; E05Y 2900/606
See application file for complete search history.

(56) References Cited

U.S. PATENT DOCUMENTS

| 8,776,319 | B1 * | 7/2014 | Chang | G06F 1/1681 16/303 |
| 8,904,601 | B2 * | 12/2014 | Hsu | H04M 1/0216 16/366 |
| 9,009,919 | B1 * | 4/2015 | Chiang | G06F 1/1681 16/303 |
| 9,261,900 | B2 * | 2/2016 | Hsu | G06F 1/16 |
| 9,274,566 | B1 * | 3/2016 | Horng | G06F 1/1681 |
| 9,290,976 | B1 * | 3/2016 | Horng | E05D 3/12 |
| 9,435,410 | B2 * | 9/2016 | Yeh | G06F 1/1681 |

(Continued)

FOREIGN PATENT DOCUMENTS

| JP | 2009-63039 A | 3/2009 |
| JP | 2013-249855 | 12/2013 |

*Primary Examiner* — Victor Batson
*Assistant Examiner* — Matthew Sullivan
(74) *Attorney, Agent, or Firm* — Notaro, Michalos & Zaccaria P.C.

(57) ABSTRACT

A biaxial hinge which can meet the requirement that the first and the second casings should be able to keep a stable stopping state at any opening and closing angle within the 360 degrees range. A first hinge shaft attached to a first casing of a terminal device is coupled in parallel to a second hinge shaft attached to a second casing by way of multiple joint parts, a first module for selectively restricting rotation and a second module for selectively restricting rotation are provided for selectively allowing the first hinge shaft and the second hinge shaft to rotate, and a first slide plate and a second slide plate are used for the first module for selectively restricting rotation and the second module for selectively restricting rotation.

6 Claims, 27 Drawing Sheets

(56) References Cited

U.S. PATENT DOCUMENTS

2013/0318746 A1\* 12/2013 Kuramochi ........... G06F 1/1681
                                                        16/342
2016/0274625 A1\* 9/2016 Horng ................... G06F 1/1681

\* cited by examiner

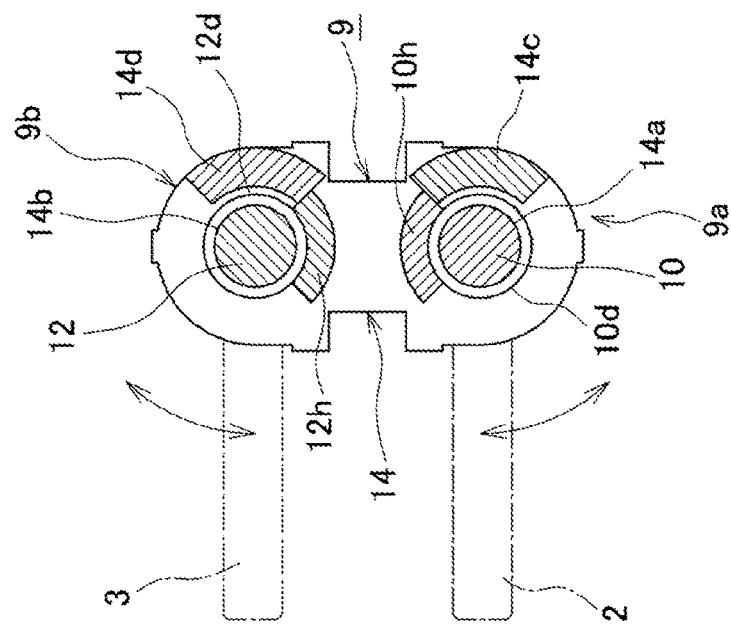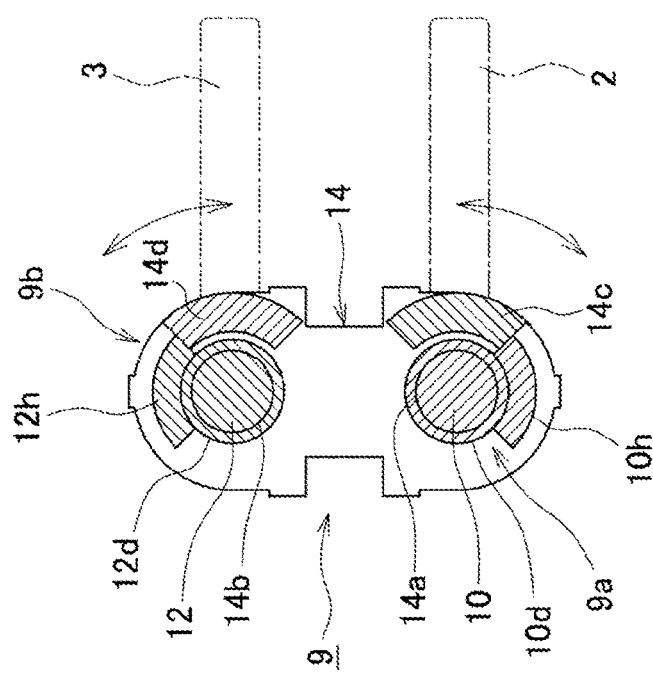

0° position

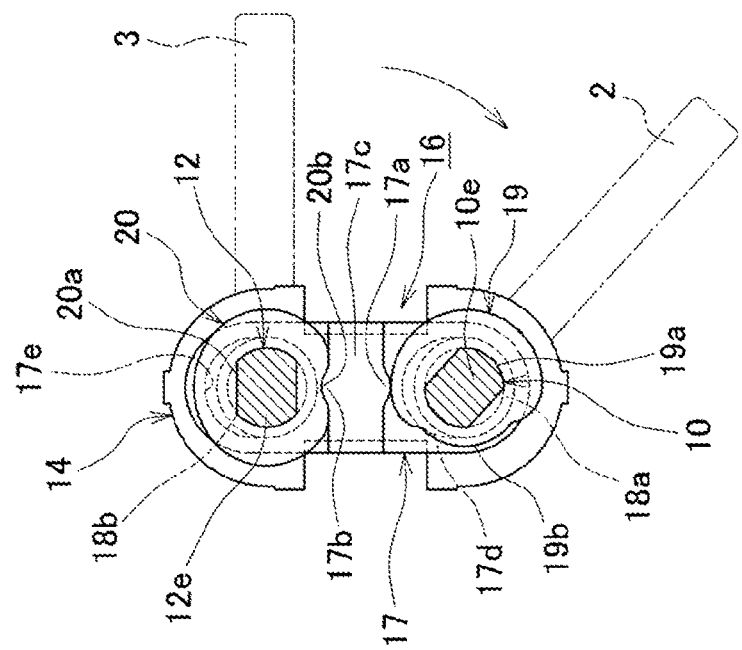

90° position

135° position

180° position

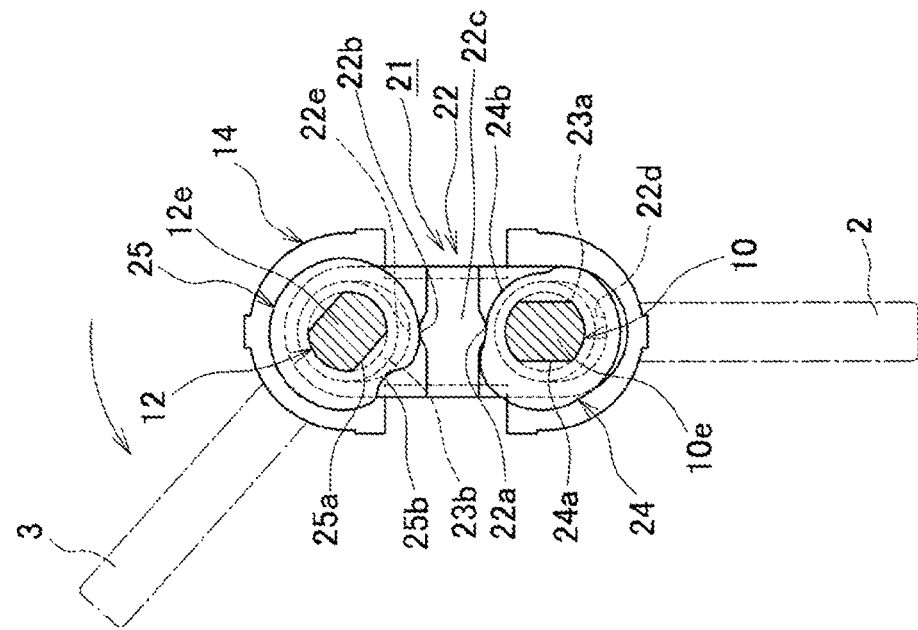
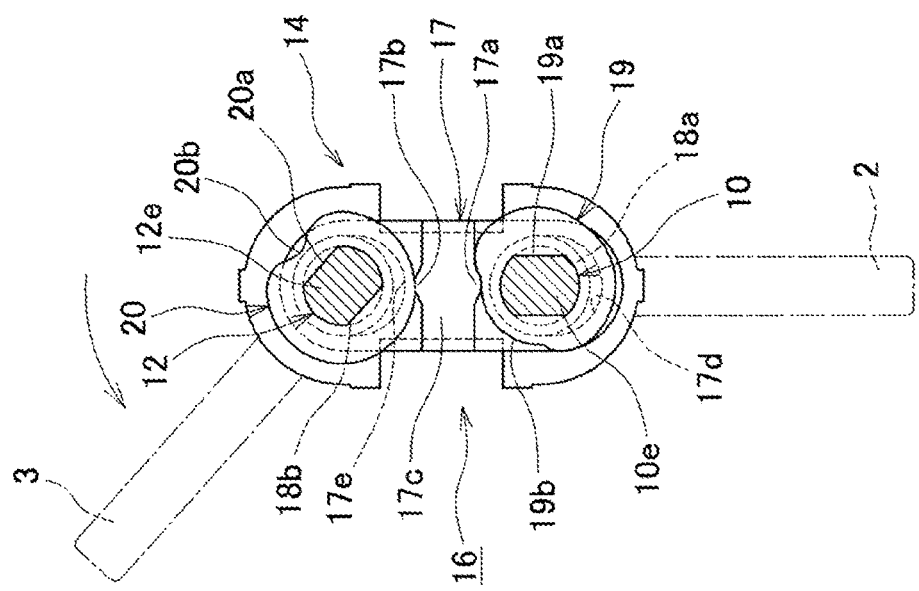
FIG. 24A
FIG. 24B
225° position

270° position

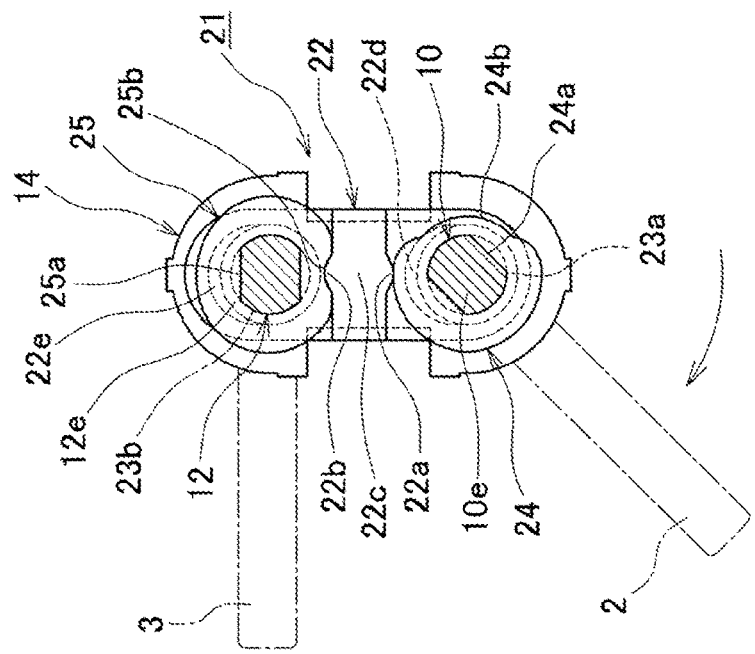
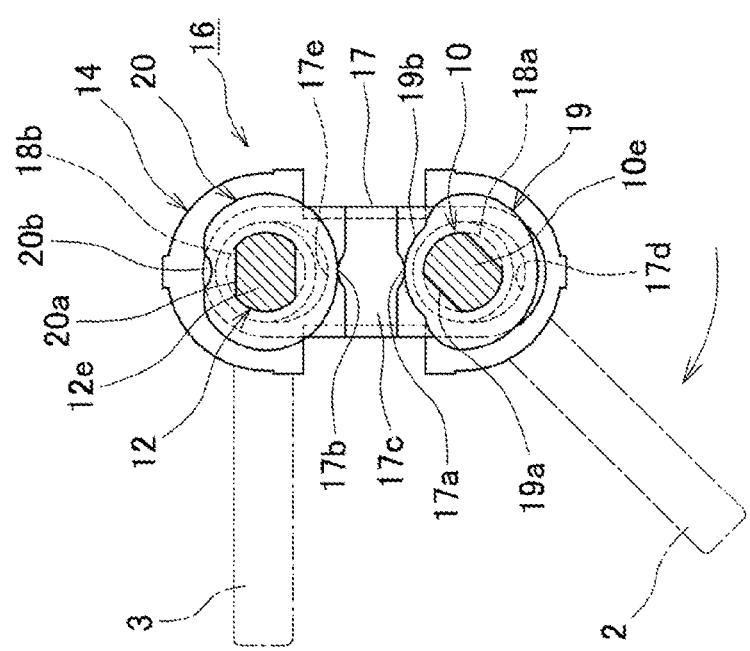

360° position

BIAXIAL HINGE AND TERMINAL DEVICE USING THE SAME

FIELD AND BACKGROUND OF THE INVENTION

Field of the Invention

The present invention relates to a biaxial hinge suitably used in opening and closing a first casing relative to a second casing of a terminal device such as a notebook PC, a mobile PC and a PDA.

Background of the Invention

Among terminal devices, such as notebook PC, mobile PC and PDA, which comprise a first casing provided with a keyboard portion and a second casing provided with a display portion, uniaxial hinges are sometimes used, wherein the hinges connect the first casing and the second casing, such that both casings can open and/or close in an upward and/or downward direction; in other cases biaxial hinges are employed, wherein each of the hinges comprises two axes, wherein the second casing can further rotate with regard to the first casing, after the former opens 90 to 180 degrees relative to the latter. The present invention relates to the biaxial hinge of these categories.

Conventionally, a biaxial hinge of the above-mentioned structure is known, such as the one disclosed in JP Laid-Open Patent Application No. 2009-063039. The biaxial hinge according to the patent document is characterized in that a shaft attached to a first member (first casing) is connected to a further shaft attached to a second member (second casing) via a joint arm, and that a means for generating friction torque is provided on each shaft, and that a link arm is provided; however, the hinge is not so designed that the first member can open more than 180 degrees relative to the second member, nor that the first casing can open relative to the second casing with regularity.

Recently, requirements for terminal devices such as notebook PC have been diversified, while such terminal devices have diversified their functions accordingly. In order to meet such requirements by allowing such terminal devices to function not only as notebook PC but also as tablet PC, the hinge needs to have a configuration such that it can restrict the opening and closing of one casing, when other casing opens and closes via the hinge between the closed state at 0 degrees and the opened state at 360 degrees, and that the casings can open and close with a prescribed regularity, in that the order of the opening and closing is restricted so as to allow either one of the casings to open and close.

Therefore, the applicant of the present invention has proposed in its previous patent application JP2012-123093 (JP Laid-Open Patent Application No. 2013-249855) a biaxial hinge which is designed such that a first casing can open relative to a second casing up to 180 degrees in each of two upward-downward directions, thus up to 360 degrees in total. This invention itself is certainly useful, but the need arose later to further improve a biaxial hinge such that it enables incremental adjustments in opening and closing angle.

The applicant has proposed a biaxial hinge which meets the above-mentioned additional requirements in its further application (JP Patent Application No. 2013-247542). The configuration of the biaxial hinge is characterized in that a first hinge shaft mounted on the first casing side is coupled in parallel to a second hinge shaft mounted on the second casing side, via a first joint member and a second joint member; that the first hinge shaft and the second hinge shaft are provided such that the former can rotate relative to the latter; a first means for selectively restricting rotation and a second means for selectively restricting rotation are provided between the first hinge shaft and the second hinge shaft, wherein the first means selectively allow the first hinge shaft to rotate and the second means have similar functions on the second hinge shaft; the first and the second means for selectively restricting rotation are constructed such that both means allow the first and the second casings to open and close in a prescribed sequence between the closed state at 0 degree and the opened state at 360 degrees.

In the above-mentioned biaxial hinge, a first means for selectively restricting rotation comprises a first locking member provided between a joint member and a slide guide member, such that the locking member is slidable in an upward and downward direction between a first hinge shaft and a second hinge shaft, wherein comprising a first cam convex portion in an upper portion and a second cam convex portion in a lower portion, wherein the first cam convex portion and the second cam convex portion are independently slidable in an upward and downward direction; a first locking cam member having a first cam concave portion and provided above said locking member, wherein the first hinge shaft passes through and engages with the first locking cam member, and a second locking cam member having a second cam concave portion and provided below the locking member, wherein the second hinge shaft passes through and engages with the second locking cam member. On the other hand, a second means for selectively restricting rotation comprises a third locking cam member attached to the first hinge shaft, wherein a rotation of the third locking cam member is restricted by the first hinge shaft; a fourth locking cam member attached to the second hinge shaft, wherein a rotation of the fourth locking cam member is restricted by the first hinge shaft; a movement stopper rotatably provided between the third locking cam member and the fourth locking cam member, wherein the movement stopper engages with the third locking cam member and the fourth locking cam member, under specific conditions depending on a rotation angle of the movement stopper; a first stopper lever rotatably attached to the first hinge shaft to engage with the movement stopper, wherein the first stopper lever is brought into a pressurized contact with the third locking cam member; and a second stopper lever rotatably attached to the second hinge shaft to engage with the movement stopper, wherein the second stopper lever is brought into a pressurized contact with the fourth locking cam member.

However, a further problem arises, in that there are too many components involved and the structure is too complex, which leads to a high manufacturing costs. A manufacturer of terminal devices such as notebook PC would set very strict demands for reducing the costs of the components of the terminal devices.

SUMMARY OF THE INVENTION

Therefore, an object of the invention is to provide a biaxial hinge in which a first casing can open and close 360 degrees relative to a second casing, wherein the biaxial hinge meets the requirement that the first casing and the second casing can keep their stable stopping state at any opening and closing angle, with a number of components as small as possible, a simplified structure and reduced manufacturing costs.

To achieve the above-mentioned object, a biaxial hinge according to the first aspect of the invention allows a first casing and a second casing to open and close relative to each other. In such biaxial hinge, a first hinge shaft provided on the first casing is coupled in parallel to a second hinge shaft provided on the second casing, such that the hinge shafts can respectively rotate, and a first means for selectively restricting rotation and a second means for selectively restricting rotation are provided between the first hinge shaft and the second hinge shaft, the hinge shafts being thereby selectively rotatable. The biaxial hinge is characterized in that the first means for selectively restricting rotation comprises: a first slide plate comprising a first locking portion movably provided in a radial direction of the first hinge shaft and the second hinge shaft, wherein the first hinge shaft and the second hinge shaft passes through the first locking portion; a first locking cam member attached to the first hinge shaft so as to be rotatable together with the first hinge shaft, wherein the first locking cam member engages with the first locking portion or not, depending on a rotation angle of the second hinge shaft; and a second locking cam member attached to the second hinge shaft so as to be rotatable together with the second hinge shaft, wherein the second locking cam member engages with the first locking portion or not, depending on a rotation angle of the second hinge shaft. The biaxial hinge is further characterized in that the second means for selectively restricting rotation comprises: a second slide plate comprising a second locking portion movably provided in a radial direction of the first hinge shaft and the second hinge shaft; a third locking cam member attached to the first hinge shaft so as to be rotatable together with the first hinge shaft, wherein the third locking cam member engages with the second locking portion or not, depending on a rotation angle of the first hinge shaft; and a fourth locking cam member attached to the second hinge shaft so as to be rotatable together with the second hinge shaft, the fourth locking cam member engages with the second locking portion or not, depending on a rotation angle of the second hinge shaft. The biaxial hinge is further characterized in that the first hinge shaft and the second hinge shaft can rotate by the first means for selectively restricting rotation and the second means for selectively restricting rotation in a specific sequence, such that the first casing and the second casing can open and close from 0 degree in a closed state to 360 degrees in a fully opened state.

Next, a biaxial hinge according to the second aspect is characterized in that it comprises a stopper means consisting of a first stopper means and a second stopper means; and that the first stopper means comprises: a first A bearing hole provided in a lower position of a stopper plate also functioning as a first joint member, wherein the first hinge shaft passes through the first A bearing hole, such that the first hinge shaft can rotate; a first stopper piece provided on the outside of the first A bearing hole; and a first projection provided on the first hinge shaft, wherein the first projection abuts against the first stopper piece or not depending on a rotation angle of the first hinge shaft. The biaxial hinge is further characterized in that the second stopper means comprises: a first B bearing hole provided in an upper position of the stopper plate also functioning as the first joint member, wherein the second hinge shaft passes through the first B bearing hole, such that the second hinge shaft can rotate; a second stopper piece provided on the outside of the first B bearing hole; and a second projection provided on the second hinge shaft, wherein the second projection abuts against the second stopper piece or not, depending on a rotation angle of the second hinge shaft.

Still further, a biaxial hinge according to the third aspect is characterized in that it comprises a means for generating friction torque consisting of a first means for generating friction torque and a second means for generating friction torque; and that the first means for generating friction torque comprises: a first friction portion provided at the periphery of one lateral side of a third A bearing hole, wherein the first hinge shaft rotatably passes through the third A bearing hole in a lower position of a third joint member; a first friction washer provided next to the first friction portion, wherein a rotation of the first friction washer is restricted by the first hinge shaft; a second friction portion provided at the periphery of one lateral side of a fourth A bearing hole, wherein the first hinge shaft rotatably passes through the fourth A bearing hole in a lower position of a fourth joint member. The biaxial hinge is further characterized in that the second means for generating friction torque comprises: a third friction portion provided at the periphery of one lateral side of a third B bearing hole, wherein the second hinge shaft passes through the third B bearing hole in an upper position of a third joint member; a second friction washer provided next to the third friction portion, wherein a rotation of the second friction washer is restricted by the second hinge shaft; and a fourth friction portion provided at the periphery of one lateral side of a fourth B bearing hole, wherein the second hinge shaft passes through the fourth B bearing hole in an upper position of a fourth joint member.

Still further, a biaxial hinge according to the fourth aspect is characterized in that it comprises a means for sucking consisting of a first means for sucking and a second means for sucking; and that the first means for sucking comprises: a first A curved cam concave portion provided at the periphery of other lateral side of the fourth A bearing hole of the fourth joint member, wherein the first hinge shaft rotatably passes through the fourth A bearing hole; a first B curved cam concave portion provided at the periphery of other lateral side of the fourth A bearing hole of the fourth joint member, the first hinge shaft rotatably passing through the fourth A bearing hole; wherein a first cam follower comprising a first A curved cam convex portion and a first B curved cam convex portion on a side facing the first A curved cam concave portion and the first B curved cam concave portion, wherein a rotation of the first cam follower is restricted by the first hinge shaft and the first cam follower is thus attached to the first hinge shaft; and a first elastic means for bringing the first A curved cam concave portion and the first B curved cam concave portion into a pressurized contact with the first A curved cam convex portion and the first B curved cam convex portion. The biaxial hinge is further characterized in that the second means for sucking comprises: a second A curved cam concave portion provided at the periphery of other lateral side of the fourth B bearing hole of the fourth joint member, wherein the second hinge shaft rotatably passes through the fourth B bearing hole; a second B curved cam concave portion provided at the periphery of other lateral side of a circumference of the fourth B bearing hole of the fourth joint member, wherein the second hinge shaft rotatably passes through the fourth B bearing hole; a second cam follower comprising a second A curved cam convex portion and a second B curved cam convex portion on a side facing the second A curved cam concave portion and the second B curved cam concave portion, wherein a rotation of the second cam follower is restricted by the second hinge shaft and the second cam follower is thus attached to the second hinge shaft; and a second elastic means for bringing the second A curved cam concave portion and the second B curved cam concave portion into a pressurized contact with the second A curved cam convex portion and the second B curved cam convex portion.

Still further, a biaxial hinge according to the fifth aspect is characterized in that it comprises a hinge case for covering a main body part extending from a stopper plate also functioning as a first joint member; and that the hinge case comprising an attaching portion provided in the interior thereof, wherein the attaching portion is detachably attached to the main body part via an attaching shaft.

Still further, a biaxial hinge according to the sixth aspect is characterized in that it comprises a hinge case for covering a main body part extending from a stopper plate also functioning as a first joint member; and that the hinge case comprises an attaching portion provided in the interior thereof, wherein the attaching portion is detachably attached to the main body part via an attaching shaft. The biaxial hinge is further characterized in that one end portion of the attaching shaft is attached to a joint member of the means for generating friction torque of the main body part, and other end portion of the attaching shaft is attached to the attaching portion of the hinge case.

Still further, a terminal device according to the seventh aspect is characterized in that it uses the biaxial hinge as described in the foregoing.

The invention is structured as described in the foregoing, so that the biaxial hinge according to the first aspect of the invention, in a reduced number of the components and a simplified structure as compared to the conventional hinges, comprises a first means for selectively restricting rotation and a second means for selectively restricting rotation, which allow the first hinge shaft and the second hinge shaft to rotate in a prescribed sequence, so that the first casing and the second casing can open and close relative to each other regularly in a prescribed sequence in a range from 0 to 360 degrees.

Next, the biaxial hinge according to the second aspect of the invention, in a reduced number of the components and a simplified structure as compared to the conventional hinges, comprises the first means for selectively restricting rotation and the second means for selectively restricting rotation, which allow the first hinge shaft and the second hinge shaft to rotate in a prescribed sequence, so that the first casing and the second casing can selectively open and close relative to each other regularly in a prescribed sequence in a range from 0 to 360 degrees. Still further, the stopper means restricts a rotation angle of the first hinge shaft and the second hinge shaft, so that the first casing and the second casing can stably keep their stopping state at a prescribed opening and closing angle.

Still further, the biaxial hinge according to the fourth aspect of the invention, in a reduced number of the components and a simplified structure as compared to the conventional hinges, comprises the first means for selectively restricting rotation and the second means for selectively restricting rotation, which allow the first hinge shaft and the second hinge shaft to rotate in a prescribed sequence, so that the first casing and the second casing can open and close relative to each other regularly in a prescribed sequence in a range from 0 to 360 degrees. Still further, the means for generating friction torque generates a rotational torque, which makes an operation feeling more comfortable and enables the first casing and the second casing to stably keep their stopping state at any opening and closing angle.

Still further, the biaxial hinge according to the third aspect of the invention, in a reduced number of the components and a simplified structure as compared to the conventional hinges, comprises the first means for selectively restricting rotation and the second means for selectively restricting rotation, which allow the first hinge shaft and the second hinge shaft to rotate in a prescribed sequence, so that the first casing and the second casing can open and close relative to each other regularly in a prescribed sequence in a range from 0 to 360 degrees. Still further, the means for sucking urges the first casing and the second casing to automatically rotate in the opening and closing directions at a prescribed opening and closing angle, so that the means for sucking conveys a click operation feeling at the time of stopping the casings to the operator. Still further, without a means for latching in order to keep the first casing and the second casing in their closed state, the means for sucking performs a function of preventing the first casing and the second casing from automatically opening from their closed state. Still further, the biaxial hinge according to the fifth aspect of the invention has an effect that one cannot see the main body part of the biaxial hinge from outside, so that biaxial hinges has a neat appearance.

Still further, the biaxial hinge according to the sixth aspect of the invention has an effect that one cannot see from outside the main body part of the biaxial hinge as covered with the hinge case, so that biaxial hinges has a neat appearance. Still further, the biaxial hinge also has an operation and effect that the hinge case allows an elastic force of the elastic means to act on the means for generating friction torque and the means for sucking, but not on the first means for selectively restricting rotation and a second means for selectively restricting rotation, so that opening and closing are conducted smoothly.

Still further, if one constructs according to the seventh aspect of the invention, one can provide the terminal device which enables the first casing and the second casing to open and close regularly in a prescribed sequence by a prescribed angle at a time, over a total maximum range of 360 degrees.

BRIEF DESCRIPTION OF THE DRAWINGS

FIGS. 18A and 18B show views of a stopper means of a biaxial hinge according to the invention, FIG. 18A showing it when a first casing is closed relative to a second casing, and FIG. 18B when both a first casing and a second casing are respectively opened 180 degrees from their original position;

FIGS. 20A and 20B show a state when a biaxial hinge according to the invention is in operation, i.e. when a second casing is moving from 0 to 90 degrees relative to a first casing, in particular FIG. 20A showing a state of a first means for selectively restricting rotation and FIG. 20B a state of a second means for selectively restricting rotation;

FIGS. 24A and 24B show a state when a biaxial hinge according to the invention is in operation, i.e. when a second casing is moving from 180 to 270 degrees relative to a first casing, in particular FIG. 24A showing a state of a first means for selectively restricting rotation and FIG. 24B a state of a second means for selectively restricting rotation;

FIGS. 26A and 26B show a state when a biaxial hinge according to the invention is in operation, i.e. when a second casing is moving from 270 to 360 degrees relative to a first casing, in particular FIG. 26A showing a state of a first means for selectively restricting rotation and FIG. 26B a state of a second means for selectively restricting rotation.

DETAILED DESCRIPTION OF THE PREFERRED EMBODIMENTS

Hereinafter, based on the drawings, reference is made to the embodiments in which a biaxial hinge according to the invention is applied to a notebook PC. The invention is not limited to applications in a notebook PC, but also applicable to terminal devices and others, such as a mobile PC and PDA, comprising a first casing and a second casing which are connected to each other, such that the casings can open and close in a range of 180 degrees or more in an upward and downward direction.

Embodiment 1

Figure 1A:
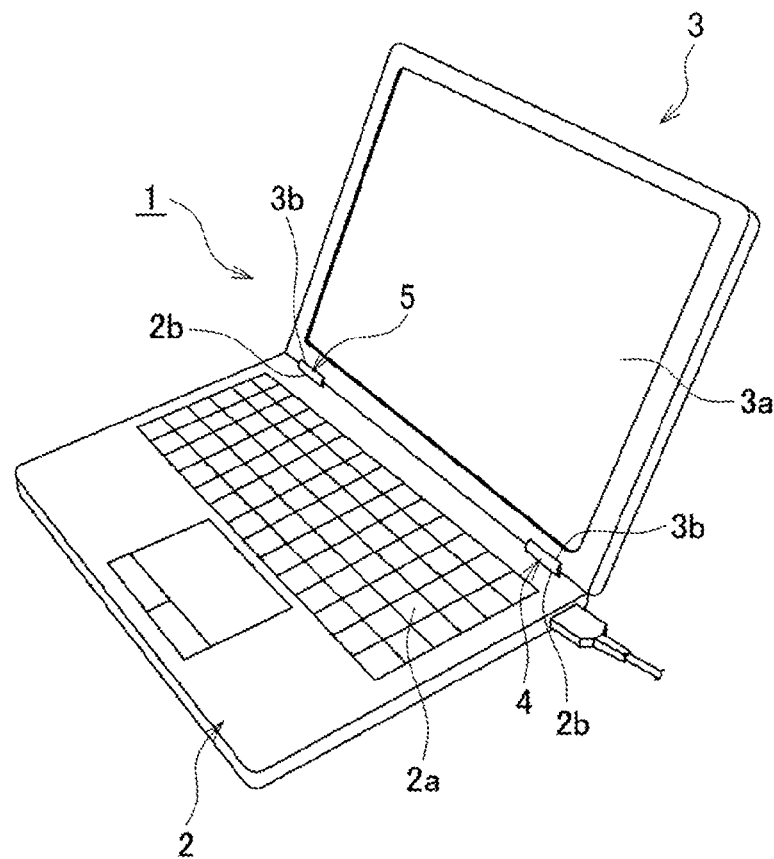
FIGS. 1A and 1B show a notebook PC being an example of a terminal device, to which a biaxial hinge according to the invention is attached, FIG. 1A being a perspective view of the notebook PC (as seen from the front side) in a state in which a first casing is opened relative to a second casing, FIG. 1B a perspective view of the notebook PC (as seen from the rear side) in a state in which a first casing is closed relative to a second casing.
Figure 1B:
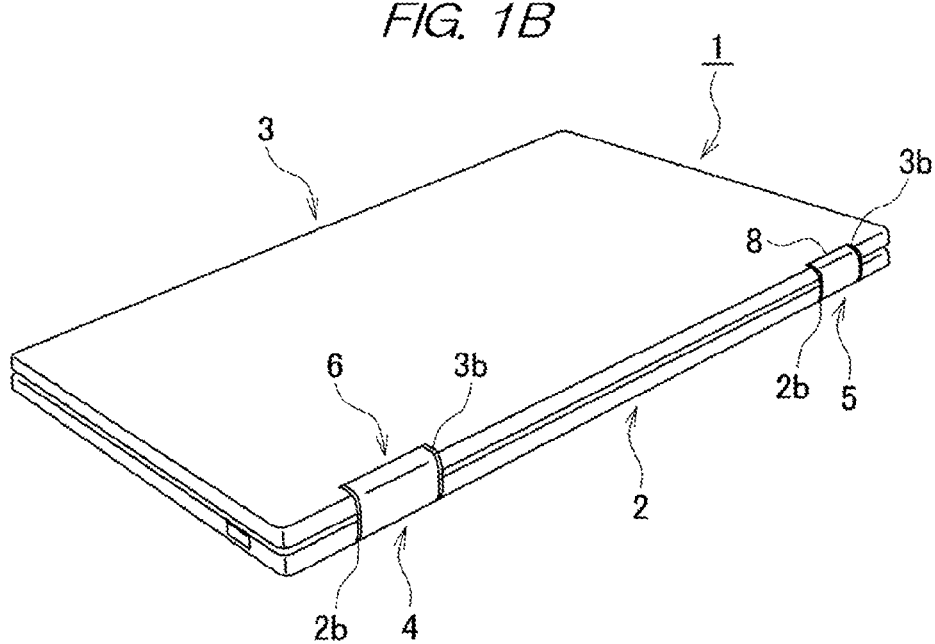

FIGS. 1A and 1B show a notebook PC 1 being an example of a terminal device using a biaxial hinge according to the invention. The notebook PC 1 comprises a first casing 2 provided with a key board portion 2a and a second casing 3 provided with a display portion 3a, and the casings are connected via a pair of biaxial hinges 4 and 5 to each other at spots on the right and left sides of their respective rear portions such that the casings can open and close.

Since both biaxial hinges 4 and 5 have an identical structure, reference will be exclusively made to a biaxial hinge 4 in the following, and not to other biaxial hinge 5. Of course, biaxial hinge denoted with reference numeral 5 can be manufactured in a manner different from the biaxial hinge 4, as long as no inconvenience occurs in operation.

Figure 3:
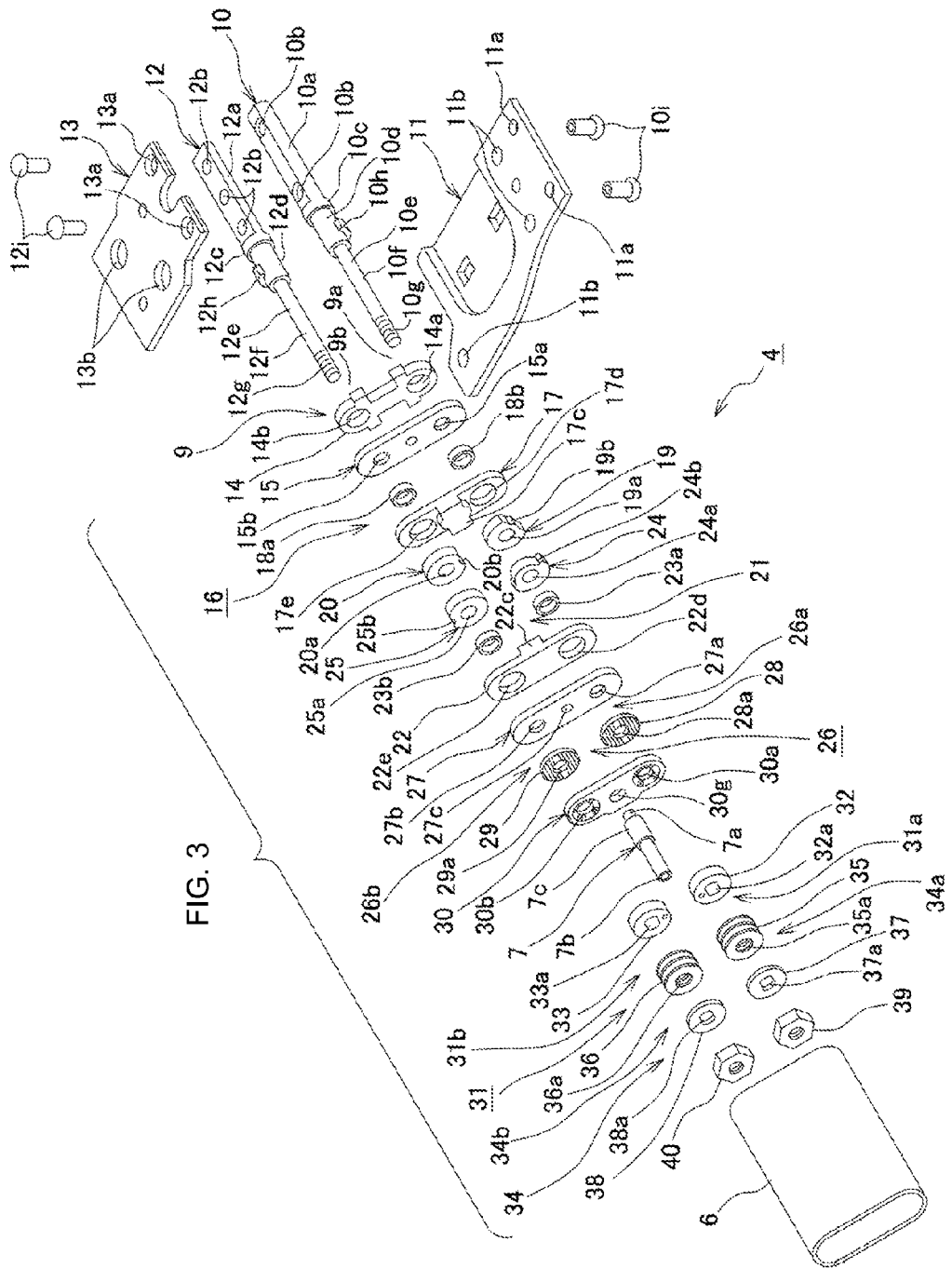
FIG. 3 is an exploded perspective view of a biaxial hinge according to the invention.
Figure 4A:
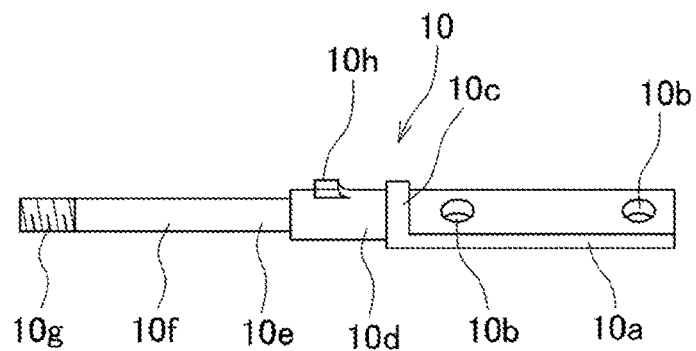
FIGS. 4A, 4B, and 4C show views of a first hinge shaft of a biaxial hinge according to the invention, FIG. 4A being an elevation view of the first hinge shaft, FIG. 4B being its top view and FIG. 4C being a left-side view of FIG. 4A.
Figure 4B:
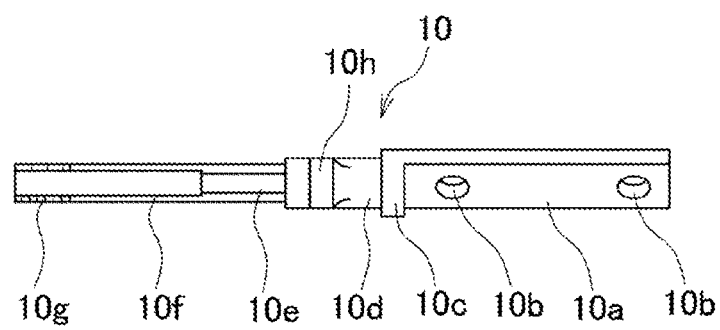
Figure 4C:
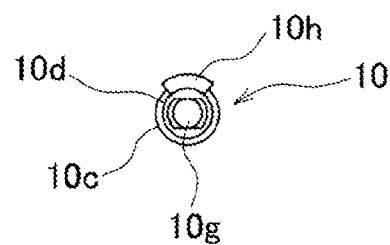

FIGS. 2 to 17B show an embodiment of a biaxial hinge 4 according to the invention. Specifically in FIGS. 2 to 4C, a reference numeral 10 and 12 denote a first hinge shaft and a second hinge shaft, respectively. First, reference is made to a structure of a first hinge shaft 10: the first hinge shaft 10 comprises, as seen from one end in particular as shown in FIGS. 3 and 4C, an attaching plate portion 10a having a substantially flat cross section, wherein attaching holes 10*b*, 10*b* are provided on its surface; a flange portion 10*c* provided next to the attaching plate portion 10*a*; a circular shaft portion 10*d* provided next to the flange portion 10*c*; a first deformed shaft portion 10*e* provided next to the circular shaft portion 10*d* and having a substantially elliptic cross section with a slightly smaller diameter than the circular shaft portion 10*d*; a second deformed shaft portion 10*f* provided next to the first deformed shaft portion 10*e* and having a substantially elliptic cross section with a slightly smaller diameter than the first deformed shaft portion 10*e*; a male screw portion 10*g* provided next to the second deformed shaft portion 10*f*; and a first projection portion 10*h* provided on an outer circumference of the circular shaft portion 10*d*.

A first attaching plate 11 is attached to an attaching plate portion 10*a*; as per mode of attaching, the former is attached to the latter by caulking respective ends of flanged attaching pins 10*i*, 10*i*, as passing through attaching holes 10*b*, 10*b* of a first hinge shaft 10 and attaching holes 11*a*, 11*a* of the first attaching plate 11. And then, the first attaching plate 11 is so structured that it passes through attaching holes 11*b*, 11*b* of the first attaching plate 11 and is attached using attaching screws (not shown) to a first casing 2. In the meantime, attaching screws can be used instead of the attaching pins 10*i*, 10*i*.

Figure 5A:
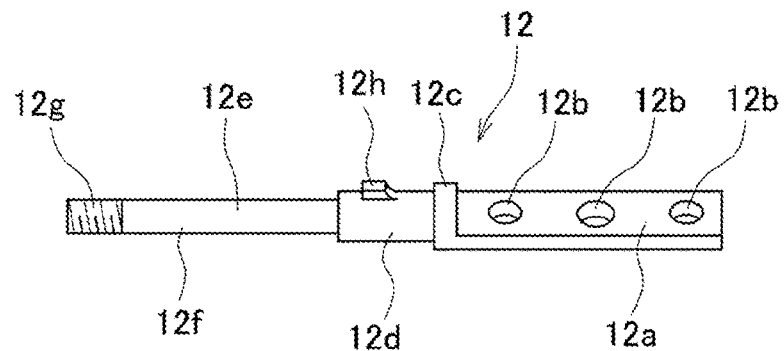
FIGS. 5A, 5B, and 5C show views of a second hinge shaft of a biaxial hinge according to the invention, FIG. 5A being an elevation view of the second hinge shaft, FIG. 5B being its top view and FIG. 5C being a left-side view of FIG. 5A.
Figure 5B:
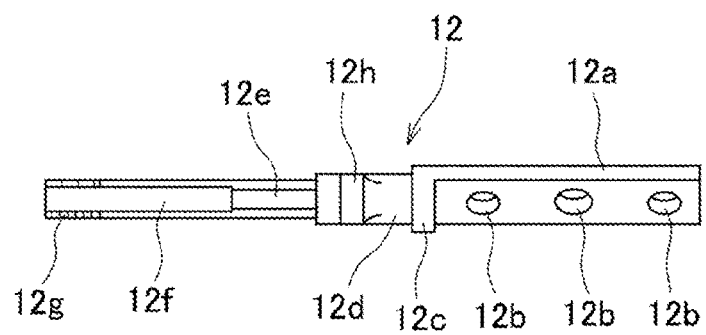
Figure 5C:
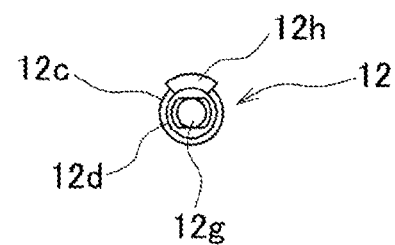
Figure 6:
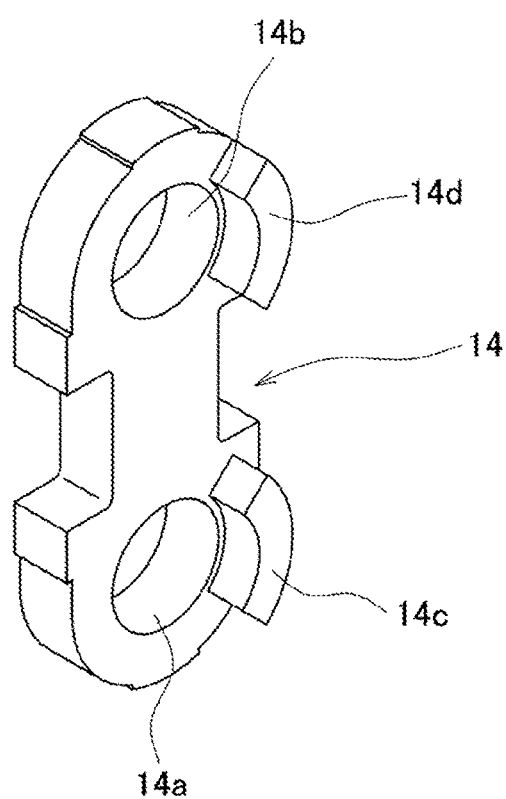
FIG. 6 is a perspective view of a stopper plate also functioning as a first joint member of a stopper means of a biaxial hinge according to the invention.
Figure 7A:
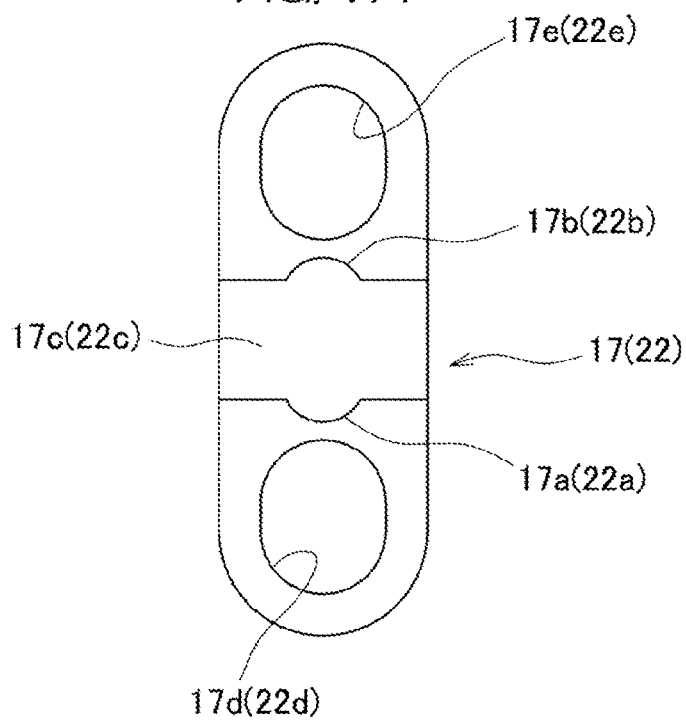
FIGS. 7A and 7B show views of a first hinge slide plate and a second hinge slide plate of a biaxial hinge according to the invention, FIG. 7A being a side view and FIG. 7B being a perspective view of each of the slide plates.
Figure 7B:
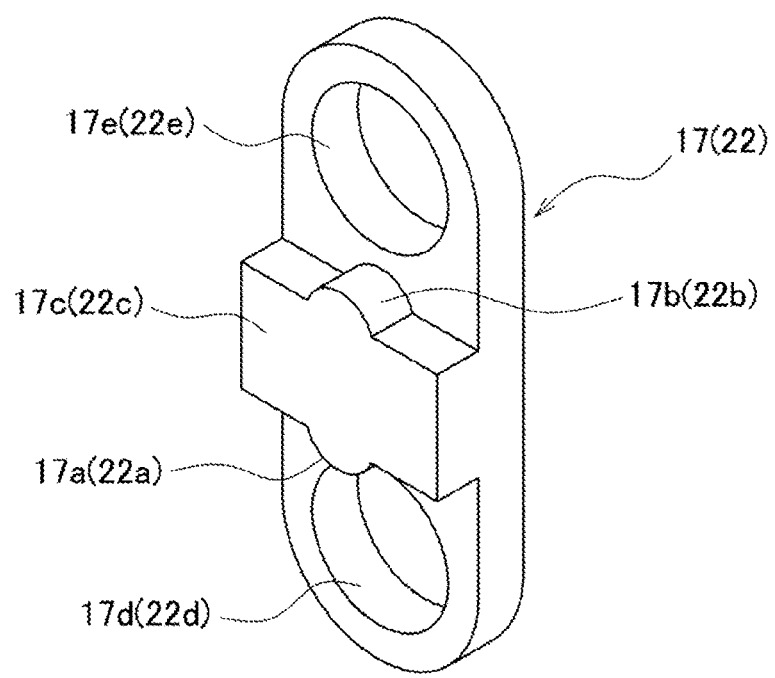
Figure 8:
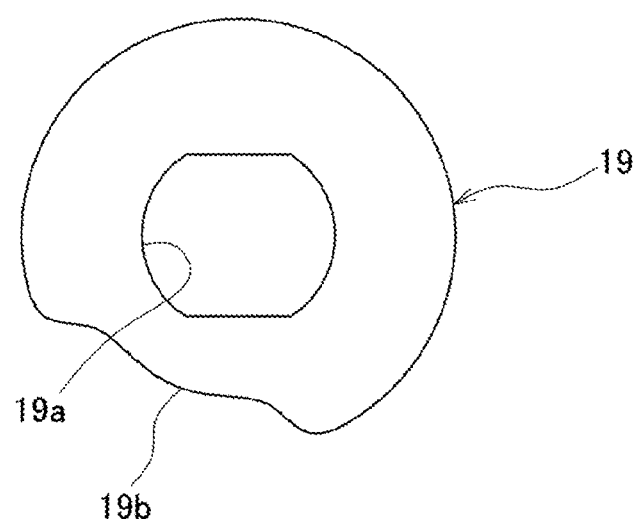
FIG. 8 is a side view of a first locking cam member of a biaxial hinge according to the invention.
Figure 9:
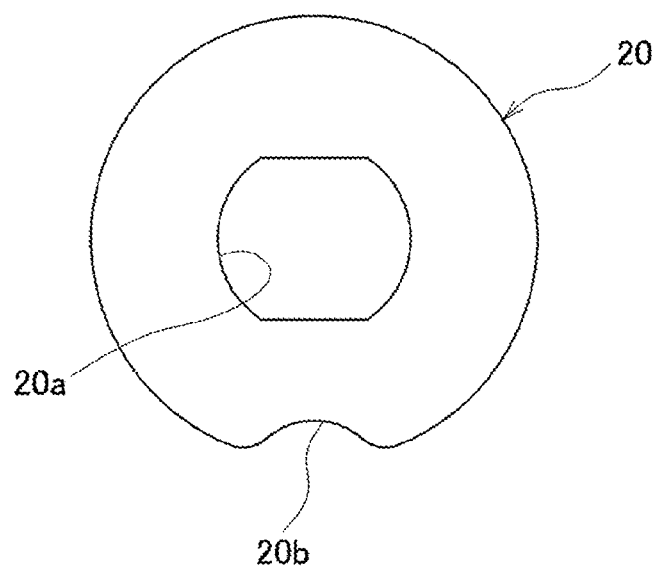
FIG. 9 is a side view of a second locking cam member of a biaxial hinge according to the invention.
Figure 10:
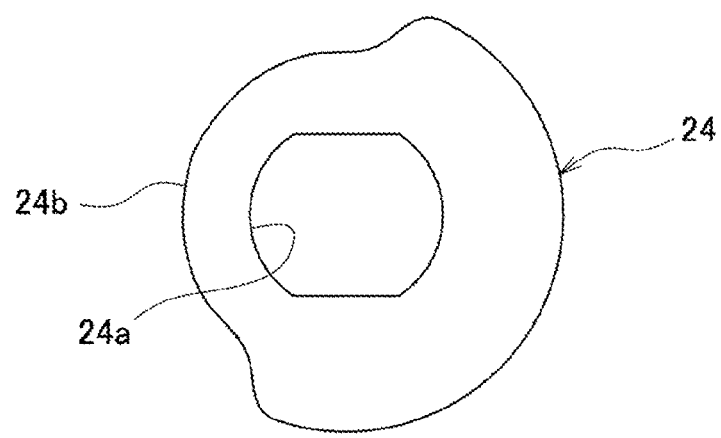
FIG. 10 is a side view of a third locking cam member of a biaxial hinge according to the invention.
Figure 11:
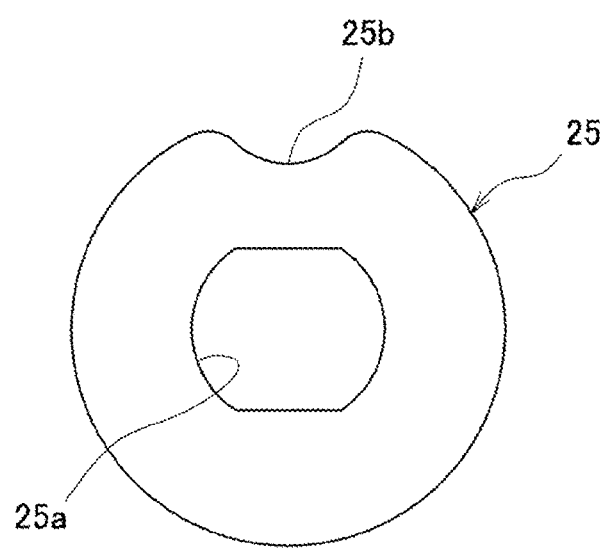
FIG. 11 is a side view of a fourth locking cam member of a biaxial hinge according to the invention.
Figure 12A:
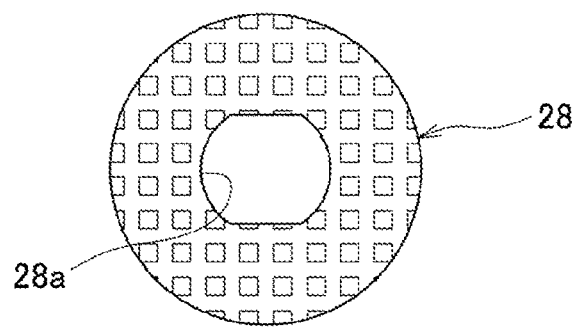
FIGS. 12A and 12B show views of a first friction washer and a second friction washer of a biaxial hinge according to the invention, FIG. 12A being a right-side view and FIG. 12B being a left-side view of each of the friction washers.
Figure 12B:
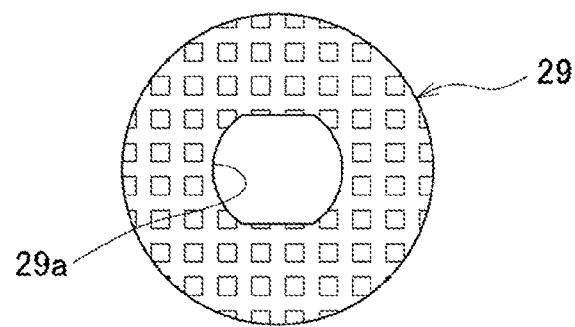
Figure 13A:
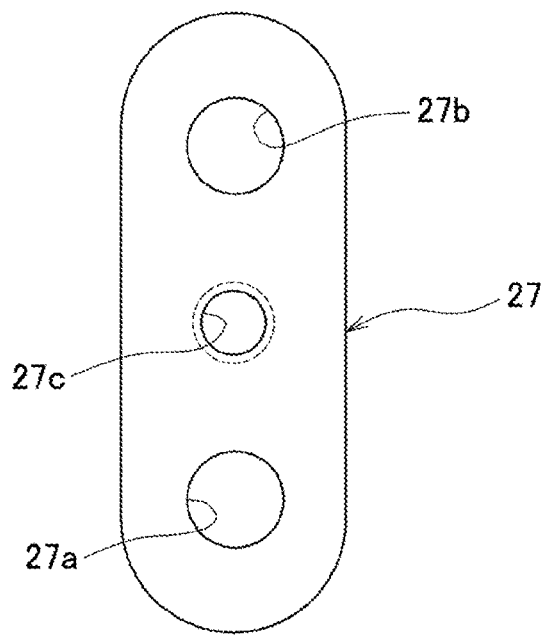
FIGS. 13A and 13B show views of a third joint member of a biaxial hinge according to the invention, FIG. 13A being a left-side view and FIG. 13B being a right-side view of each of the third joint member.
Figure 13B:
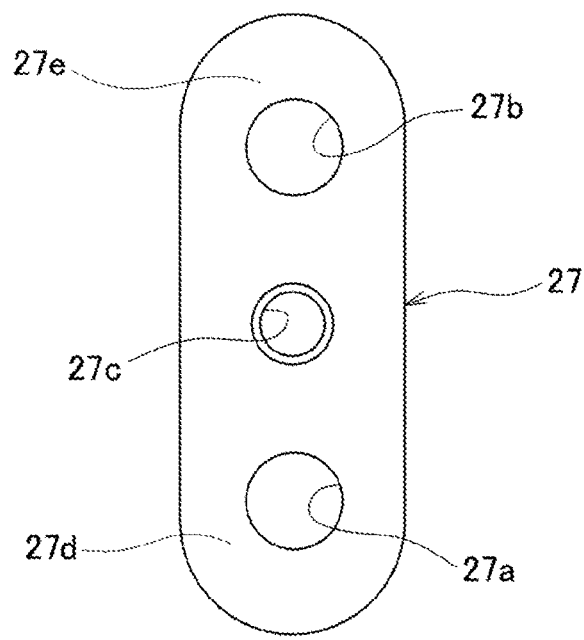
Figure 14A:
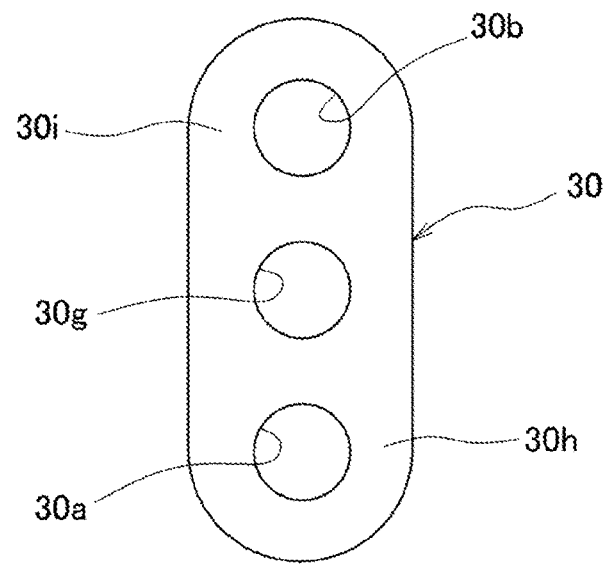
FIGS. 14A and 14B show views of a fourth joint member of a biaxial hinge according to the invention, FIG. 14A being a left-side view and FIG. 14B being a right-side view of each of the third joint member.
Figure 14B:
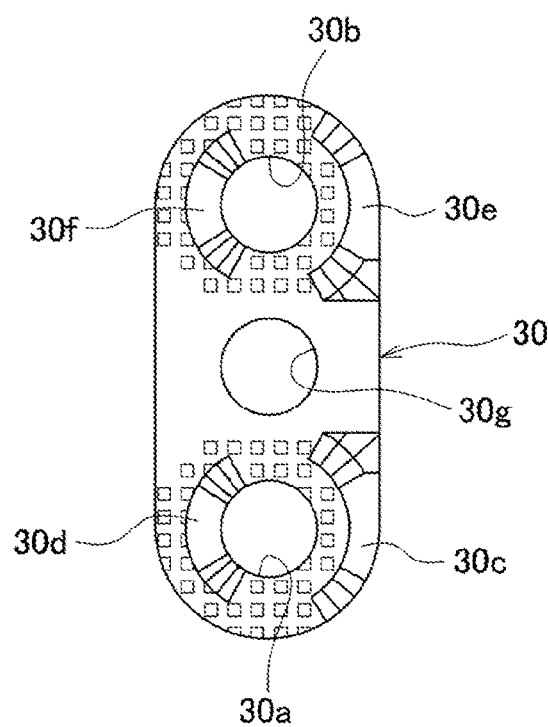
Figure 15A:
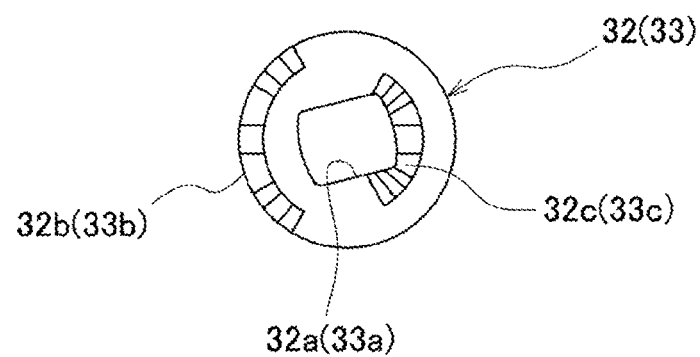
FIGS. 15A and 15B show views of a first cam follower and a second cam follower of a biaxial hinge according to the invention, FIG. 15A being a right-side view and FIG. 15B being an elevation view of each of the cam followers.
Figure 15B:
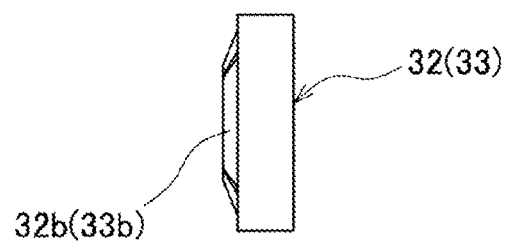
Figure 16A:
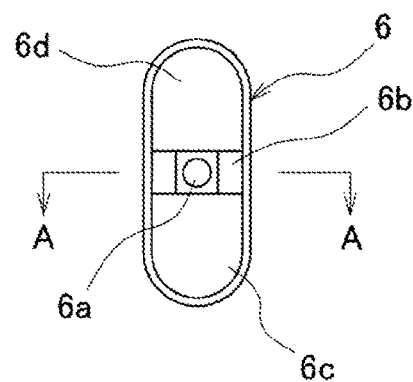
FIGS. 16A and 16B show views of a hinge case of a biaxial hinge according to the invention, FIG. 16A being a right-side view of the hinge case and FIG. 16B being a sectional view along line A-A of FIG. 16A.
Figure 16B:
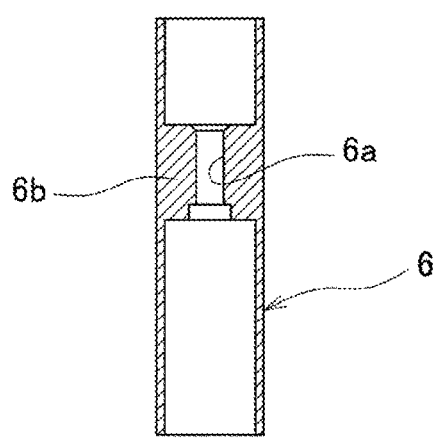

Next, a reference numeral 12 denotes a second hinge shaft, which is placed in parallel to a first hinge shaft 10 in upward and downward direction. The second hinge shaft 12 comprises, as seen from one end in particular as shown in FIGS. 3 and 5, an attaching plate portion 12*a* having a substantially flat cross section, wherein attaching holes 12*b*, 12*b* are provided on its surface; a flange portion 12*c* provided next to the attaching plate portion 12*a*; a circular shaft portion 12*d* provided next to the flange portion 12*c*; a first deformed shaft portion 12*e* provided next to the circular shaft portion 12*d* and having a substantially elliptic cross section with a slightly smaller diameter than the circular shaft portion 12*d*; a second deformed shaft portion 12*f* provided next to the first deformed shaft portion 12*e* and having a substantially elliptic cross section as well, but with a smaller diameter than the first deformed shaft portion 12*e*; a male screw portion 12*g* provided next to the second deformed shaft portion 12*f*; and a second projection 12*h* provided on an outer circumference of the circular shaft portion 12*d*.

A second attaching plate 13 is attached to an attaching plate portion 12*a*; as per mode of attaching, the former is attached to the latter by caulking respective ends of flanged attaching pins 12*i*, 12*i* as passing through attaching holes 12*b*, 12*b* of a second hinge shaft 12 and attaching holes 13*a*, 13*a* of the second attaching plate 13. And then, the second attaching plate 13 is so structured that it passes through attaching holes 13*b*, 13*b* of the second attaching plate 13 and is attached using attaching screws (not shown) to a second casing 3. In the meantime, attaching screws can be used instead of the attaching pins 12*i*, 12*i*.

Next, reference is made to a stopper means 9 for restricting rotation angle of a first hinge shaft 10 and a second hinge shaft 12. The stopper means 9 consists, as shown in FIGS. 3, 4 and 18, of a first stopper means 9*a* and a second stopper means 9*b*. The first stopper means 9*a* comprises a first A bearing hole 14*a* being a part of a stopper plate 14 also functioning as a first joint member, wherein the first A bearing hole 14*a* bears a circular shaft portion 10*d* of a first hinge shaft 10 such that the circular shaft portion can rotate; a first stopper piece 14*c* provided on the outside of the first A bearing hole 14*a* in the shape of an arc; and a first projection 10*h* provided on an outer circumference of the circular shaft portion 10*d* of the first hinge shaft 10. The first stopper means 9*a* thus restricts a range of the rotation angle of the first hinge shaft 10 to 180 degrees. The second stopper means 9*b* comprises a first B bearing hole 14*b* being a part of a stopper plate 14 also functioning as a first joint member, wherein the first B bearing hole 14*b* bears a circular shaft portion 12*d* of a second hinge shaft 12 such that the circular shaft portion can rotate; a first stopper piece 14*c* provided on the outside of the first B bearing hole 14*b* in the shape of an arc; and a second projection 12*h* provided on an outer circumference of the circular shaft portion 12*d* of the second hinge shaft 12. The second stopper means 9*b* thus restricts a range of the rotation angle of the second hinge shaft 12 up to 180 degrees.

Figure 19A:
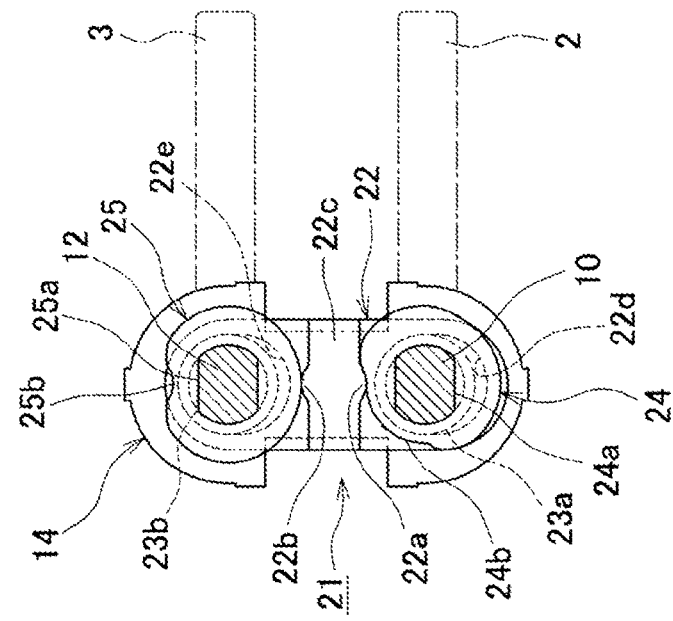
FIGS. 19A and 19B show a state before the operation of a biaxial hinge according to the invention starts, i.e. when a second casing is closed, thus found at 0 degree relative to a first casing, in particular FIG. 19A showing a state of a first means for selectively restricting rotation and FIG. 19B a state of a second means for selectively restricting rotation.

As shown in particular in FIGS. 3 and 19A, a first means for selectively restricting rotation 16 is provided next to a stopper means 9 as described above. The first means for selectively restricting rotation 16 comprises a first slide plate 17 comprising a second A bearing hole 15*a*, wherein a first deformed shaft portion 10*e* of a first hinge shaft 10 passes through the second A bearing hole 15*a*, such that the first deformed shaft portion of the first hinge shaft can rotate, a second B bearing hole 15*b*, wherein a first deformed shaft portion 12*e* of a second hinge shaft 12 passes through the second B bearing hole 15*b* such that the first deformed shaft portion of the second hinge shaft can rotate. The first slide plate 17 further comprises a second joint member 15 provided next to a first joint member (stopper plate) 14 and a first locking portion 17*c*, on which a first convex portion 17*a* and a second convex portion 17*b* are provided in upper and lower positions of one lateral surface, wherein a first guide hole 17*d* and a second guide hole 17*e*, both in an elliptic shape, are respectively provided above and below the first locking portion 17*c*. Still further, the first means for selectively restricting rotation comprises a first spacer ring 18*a*, through which the first deformed shaft portion 12*e* of the second hinge shaft 12 passes such that the second hinge shaft can rotate, wherein the first spacer ring is further housed into the first guide hole 17*d*, such that the former can slide in the latter, and a second spacer ring 18*b*, through which the first deformed shaft portion 10*e* of the first hinge shaft 10 passes such that the first hinge shaft can rotate, a first locking cam member 19 and a second locking cam member 20 respectively provided above and below the first locking portion 17*c* of the first slide plate 17; the first locking cam member is built up by allowing the first deformed shaft portion 12*e* of the second hinge shaft 12 to pass through and engage with a first deformed insertion hole 19*a* provided at an axial center in an axial direction of the first locking cam member, while the second locking cam member—by allowing the first deformed shaft portion 10*e* of the first hinge shaft 10 to pass through and engage with a second deformed insertion hole 20*a* provided at an axial center in an axial direction of the second locking cam member; furthermore, a wide first curved concave portion 19*b* is provided on an outer circumference of the first locking cam member 19, and a narrow first concave portion 20*b* on an outer circumference of the second locking cam member 20. In the meantime, the width in an axial direction of each spacer ring 18*a*, 18*b* is desirably made to be slightly longer than the thickness of the first slide plate 17, so that the spacer rings function such that they can mitigate a friction resistance of the first slide plate 17 which slides as sandwiched by the second joint member 15 on one hand and by the first locking cam member 19 and the second locking cam member 20 on the other. Alternatively, the first hinge shaft 10 and the second locking cam member 20 can be constructed such that they receive a third joint member 27 at a step between their respective first deformed shaft portions 10e, 12e on one hand and respective second deformed shaft portions 10f, 12f on the other; such measure is taken to effectively prevent an elastic force of an elastic means 34 from acting on the first means for selectively restricting rotation 16 and a second means for selectively restricting rotation 21.

Figure 19B:
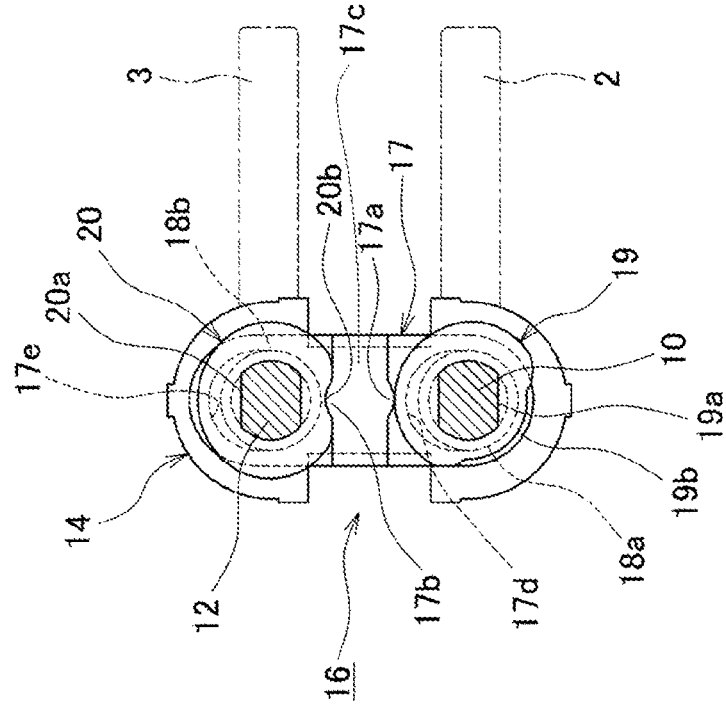

As shown in particular in FIGS. 3 and 19B, a second means for selectively restricting rotation 21 is provided next to a first means for selectively restricting rotation 16 as described above. The second means for selectively restricting rotation 21 comprises a second slide plate 22 comprising a second locking portion 22c, on which a third convex portion 22a and a fourth convex portion 22b are provided in upper and lower positions of one lateral surface, wherein a third guide hole 22d and a fourth guide hole 22e, both in an elliptic shape, are respectively provided above and below the second locking portion 22c. Still further, the second means for selectively restricting rotation comprises a third spacer ring 23a, through which the first deformed shaft portion 12e of the second hinge shaft 12 passes such that the first deformed shaft portion of the second hinge shaft can rotate, wherein the third spacer ring is further housed into the third guide hole 22d such that the former can slide in the latter, and a fourth spacer ring 23b, through which the first deformed shaft portion 10e of the first hinge shaft 10 passes such that the first deformed shaft portion of the first hinge shaft can rotate, wherein the fourth spacer ring is further housed into the fourth guide hole 22e such that the former can slide in the latter, as well as a third locking cam member 24 and a fourth locking cam member 25 respectively provided above and below the second locking portion 22c of the second slide plate 22; the third locking cam member is built up by allowing the first deformed shaft portion 12e of the second hinge shaft 12 to pass through and engage with a third deformed insertion hole 24a provided at an axial center in an axial direction of the third locking cam member, while the fourth locking cam member—by allowing the first deformed shaft portion 10e of the first hinge shaft 10 to pass through and engage with a fourth deformed insertion hole 25a provided at an axial center in an axial direction of the third locking cam member; furthermore, a wide second curved concave portion 24b is provided on an outer circumference of the third locking cam member 24, and a narrow second concave portion 25b on an outer circumference of the fourth locking cam member 25. Still further, the second means for selectively restricting rotation comprises a third joint member 27 comprising a third A bearing hole 27a and a third B bearing hole 27b respectively provided below and above the third joint member, wherein the third A bearing hole rotatably bears a second deformed shaft portion 10f of the first hinge shaft 10 which passes through the third A bearing hole in an axial direction, and wherein the third B bearing hole rotatably bears a second deformed shaft portion 12f of the second hinge shaft 12 which passes through the third B bearing hole in an axial direction. In the meantime, the width in an axial direction of each spacer ring 23a, 23b is desirably made to be slightly longer than the thickness of the second slide plate 22, so that the spacer rings function such that they can mitigate a friction resistance of the second slide plate 22 which slides as sandwiched by the third joint member 27 on one hand and by the third locking cam member 24 and the fourth locking cam member 25 on the other. Alternatively, the first hinge shaft 10 and the fourth locking cam member 25 can be constructed such that they receive the third joint member 27 at a step between their respective first deformed shaft portions 10e, 12e on one hand and respective second deformed shaft portions 10f, 12f on the other; such measure is taken to effectively prevent an elastic force of an elastic means 34 from acting on the first means for selectively restricting rotation 16 and a second means for selectively restricting rotation 21.

As shown in particular in FIG. 3, a means for generating friction torque 26 is provided next to a second means for selectively restricting rotation 21 as described above. The means for generating friction torque 26 consists of a first means for generating friction torque 26a on the first hinge shaft 10 side and a second means for generating friction torque 26b on the second hinge shaft 12 side. The first means for generating friction torque 26a comprises a first friction portion 27d surrounding a third A bearing hole 27a provided on a third joint member 27, through which a second deformed shaft portion 10f of the first hinge shaft 10 passes such that the third A bearing hole rotatably bears the second deformed shaft portion, and a first friction washer 28 with waffle-knurl pattern on both surfaces, wherein the first friction washer is built up by allowing the second deformed shaft portion 10f of the first hinge shaft 10 to pass through and engage with a fifth deformed insertion hole 28a provided at an axial center in an axial direction of the first friction washer corresponding to third A bearing hole. The first means for generating friction torque further comprises a third friction portion 30h of a fourth joint member 30 provided next to the first friction washer 28, wherein the second deformed shaft portion 10f of the first hinge shaft 10 passes through a fourth A bearing hole 30a provided on a lower position of the fourth joint member, and a first elastic means 34a consisting of a plurality of first disc springs 35, wherein the second deformed shaft portion 10f of the first hinge shaft 10 passes through respective insertion holes 35a of the first disc springs, while the first disc springs are brought into a pressurized contact with each other by means of a first fastening nut 39 via a first backing washer 37.

A second means for generating friction torque 26b comprises a second friction portion 27e surrounding a third B bearing hole 27b provided on a third joint member 27, through which a second deformed shaft portion 12f of the second hinge shaft 12 passes such that the third B bearing hole rotatably bears the second deformed shaft portion, and a second friction washer 29 with waffle-knurl pattern on both surfaces, wherein the second friction washer is built up by allowing the second deformed shaft portion 12f of the second hinge shaft 12 to pass through and engage with a sixth deformed insertion hole 29a provided at an axial center in an axial direction of the second friction washer corresponding to third B bearing hole. The second means for generating friction torque further comprises a fourth friction portion 30i of a fourth joint member 30, wherein the second deformed shaft portion 12f of the second hinge shaft 12 passes through fourth B bearing hole 30b provided on a lower position of the fourth joint member next to the second friction washer 29, and a second elastic means 34b consisting of a plurality of second disc springs 36, wherein the second deformed shaft portion 12f of the second hinge shaft 12 passes through respective insertion holes 36a of the second disc springs, while the second disc springs are brought into a pressurized contact with each other by means of a second fastening nut 40 via a second backing washer 38.

As shown in particular in FIG. 3, a means for sucking 31 is provided next to a means for generating friction torque 26. The means for sucking 31 consists of a first means for sucking 31a on the first hinge shaft 10 side below and a second means for sucking 31b on the second hinge shaft 12 side above. First, as per the first means for sucking 31a, it comprises a large first A curved cam concave portion 30c provided outward on a circumference of a fourth A bearing hole 30a of a fourth joint member 30 and a small first B curved cam concave portion 30d provided inward on a circumference of the fourth A bearing hole 30a of the fourth joint member 30. The first means for sucking further comprises a first cam follower 32, wherein a second deformed shaft portion 10f of a first hinge shaft 10 passes through and engages with a seventh deformed insertion hole 32a of the first cam follower, and wherein a large first A curved cam convex portion 32b provided outward on a lateral surface of the first cam follower faces the first A curved cam concave portion 30c, while a small first B curved cam convex portion 32c provided inward on a lateral surface of the first cam follower faces the first B curved cam concave portion 30d. Still further, the first means for sucking comprises a first elastic means 34a consisting of a plurality of first disc springs 35, which is in contact with the first cam follower 32, wherein the second deformed shaft portion 10f of the first hinge shaft 10 passes through respective insertion holes 35a at an axial center in an axial direction of the first disc springs. Still further, the first means for sucking comprises a first backing washer 37 in contact with the first elastic means 34a, wherein the second deformed shaft portion 10f of the first hinge shaft 10 passes through respective insertion holes 37a at an axial center in an axial direction of the first backing washer; and a first fastening nut 39 screwed onto a male screw portion 10g provided on a free end side of the second deformed shaft portion 10f of the first hinge shaft 10.

As per a second means for sucking 31b, it comprises a large second A curved cam concave portion 30e provided outward on a circumference of a fourth B bearing hole 30b of a fourth joint member 30 and a small second B curved cam concave portion 30f provided inward on a circumference of the fourth B bearing hole 30b of the fourth joint member 30. The second means for sucking further comprises a second cam follower 33, wherein a second deformed shaft portion 12f of a second hinge shaft 12 passes through and engages with a eighth deformed insertion hole 33a of the second cam follower, and wherein a large second A curved cam convex portion 33b provided outward on a lateral surface of the second cam follower faces the second A curved cam concave portion 30e, while a small second B curved cam convex portion 33c provided inward on a lateral surface of the second cam follower faces the second B curved cam concave portion 30f. Still further, the second means for sucking comprises a second elastic means 34b consisting of a plurality of second disc springs 36, which is in contact with the second cam follower 33, wherein the second deformed shaft portion 12f of the second hinge shaft 12 passes through respective insertion holes 36a at an axial center in an axial direction of the second disc springs. Still further, the second means for sucking comprises a second backing washer 38 in contact with the second elastic means 34b, wherein the second deformed shaft portion 12f of the second hinge shaft 12 passes through respective insertion holes 38a at an axial center in an axial direction of the second backing washer; and a second fastening nut 40 screwed onto a male screw portion 12g provided on a free end side of the second deformed shaft portion 12f of the second hinge shaft 12.

Figure 17A:
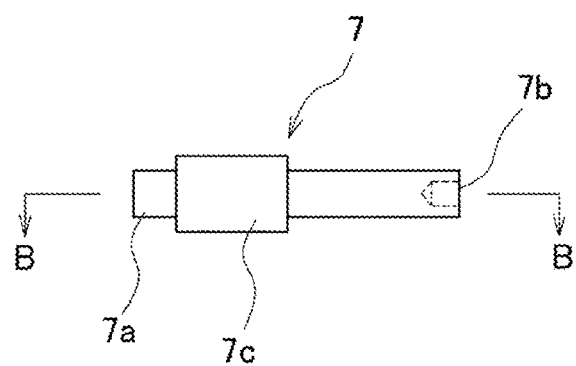
FIGS. 17A and 17B show views of an attaching shaft of a biaxial hinge shown in FIG. 16 according to the invention, FIG. 17A being an elevation view of the attaching shaft and FIG. 17B being a sectional view along line B-B of each of FIG. 17A.
Figure 17B:
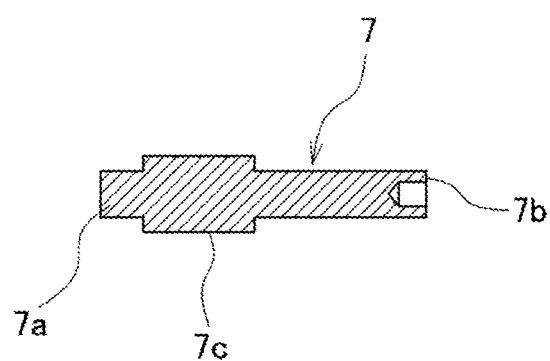

In other words, a main body part 4a extending from a stopper plate 14, which also functions as a first joint member attached to a first hinge shaft 10 and a second hinge shaft 12, is housed into a hinge case 6. FIG. 3, FIGS. 17A and 17B show an attaching shaft 7 for attaching a hinge case 6 to a biaxial hinge 4. The attaching shaft 7 comprises one end portion 7a and other end portion 7b, and a large diameter portion 7c is provided on a central portion.

In addition, in particular as shown in FIGS. 2, 3, 16A and 16B, a hinge case 6 has a shape of cylinder with a cross section in a shape of oblong hole, wherein an attaching portion 6b equipped with an attaching hole 6a crossing over a central portion is provided in its interior. A first insertion hole 6c through which a first means for generating friction torque 26a and a first means for sucking 31a on the first hinge shaft side of a biaxial hinge 4 pass is provided below the attaching portion 6b, while a second insertion hole 6d through which a second means for generating friction torque 26b and a second means for sucking 31b on the second hinge shaft side of a biaxial hinge 4 pass—above the attaching portion 6b. Still further, a stopper means 9, a first means for selectively restricting rotation 16 and a second means for selectively restricting rotation 21 are housed into a space toward portions of the hinge shafts not housed into the hinge case, while a means for generating friction torque 26 and a means for sucking 31 are both housed into a space beyond the attaching portion 6b toward the tip ends of the hinge shafts housed into the hinge case.

In the meantime, a mode of attaching an attaching shaft 7 according to this embodiment is as follows: first its one end portion 7a side is inserted into an attaching hole 27a provided on a third joint member 27 and namely its large diameter portion 7c passes through an insertion hole 30g provided on a fourth joint member 30, while its other end portion 7b side is inserted into an attaching hole 6a provided on an attaching portion 6b of hinge case 6 and then its protruding end is caulked.

Figure 2:
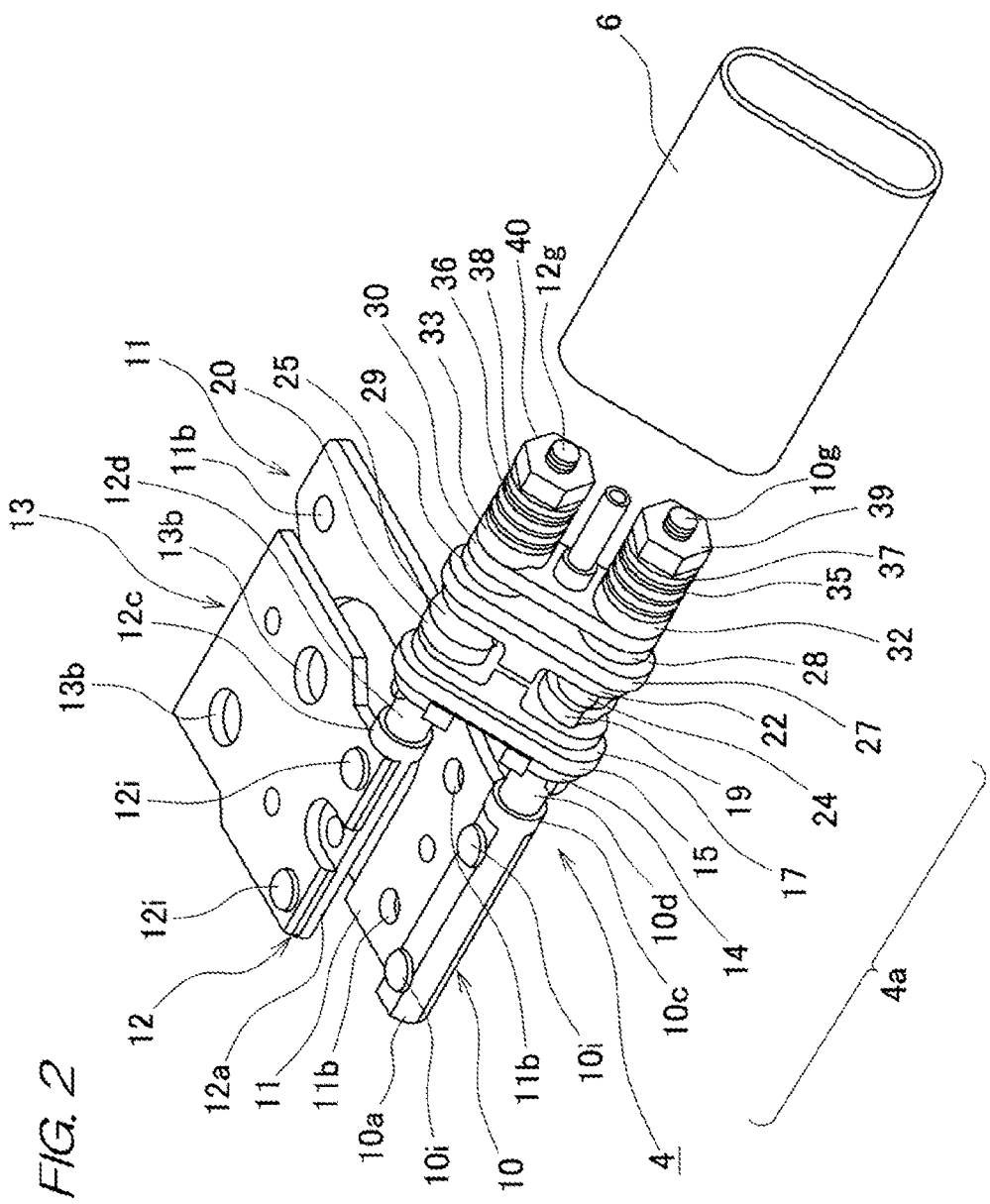
FIG. 2 is a perspective view of a biaxial hinge according to the invention in which a hinge case is removed from its main body.

Moreover, in particular as shown in FIG. 2, a hinge case 6 is housed into housing concave portions 2b, 3b respectively provided on a first and a second casings 2, 3. Still further, a hinge case 8 of other biaxial hinge 5 has the same structure.

In the following, reference is made to an operation of the biaxial hinge 4 as described above. First, the biaxial hinge 4 according to the present invention is a biaxial hinge for opening and closing the first casing 2 relative to the second casing 3, wherein the both casings constitute the notebook PC 1. The biaxial hinge is characterized in that the first hinge shaft 10 attached to the first casing 2 side via the first attaching plate 11 is coupled in parallel to the second hinge shaft 12 attached to the second casing 3 side via the second attaching plate 13, by means of the stopper plate 14 also functioning as the first joint member, the second joint member 15, the third joint member 27 and the fourth joint member 30, such that both hinge shafts can rotate. When the first casing 2 opens and closes relative to the second casing 3 (and vice versa), the first means for selectively restricting rotation 16 and the second means for selectively restricting rotation 21 take effect in a prescribed sequence, such that both of the first casing 2 and the second casing 3 can rotate 180 degrees in total from the starting point of opening and closing, in order to enable the first casing 2 and the second casing 3 to open and close 360 degrees relative to each other. However, the sequence of opening and closing the first casing 2 and the second casing 3 relative to each other is not limited to what is described in the embodiment as follows. Still further, the biaxial hinge 4 according to the present invention executes its opening and closing, initially starting from the closed state of the first casing 2 and the second casing 3, by a clockwise rotation of the first casing 2 with the first hinge shaft 10 as a supporting point, as well as by a counterclockwise rotation of the second casing 3 with the second hinge shaft 12 as a supporting point, as shown in FIGS. 19A to 27B. In the meantime, FIGS. 19A to 27B are merely explanatory views for a comprehensive illustration of the operations according to the present invention. Therefore, respective views (e.g., views 19A and 19B) of these drawings do not reflect corresponding actual cross sections.

Namely, reference is first made to how the first casing 2 opens from its closed state, i.e. the opening and closing angle of 0 degree relative to the second casing 3 of the notebook PC 1. When the first casing 2 is closed relative to the second casing 3 as shown in FIGS. 19A and 19B, the outer circumference of the first locking cam member 19 (attached to the first hinge shaft 10) of the first means for selectively restricting rotation 16 is in contact with the first convex portion 17a of the first locking portion 17c of the first slide plate 17; and the third convex portion 22a, which is provided on the second locking portion 22c of the second means for selectively restricting rotation 21, falls into the second curved concave portion 24b of the third locking cam member 24. On the other hand, since the second convex portion 17b of the first locking portion 17c of the first slide plate 17 falls into the first concave portion 20b of the second locking cam member 20 of the first means for selectively restricting rotation 16, a counterclockwise rotation of the second hinge shaft 12 is restricted, even though the fourth convex portion 22b of the second locking portion 22c of the second slide plate 22 abuts against the outer circumference of the fourth locking cam member 25 of the second means for selectively restricting rotation 21. Accordingly, only a clockwise rotation of the first hinge shaft 10 is allowed such that the first casing 2 rotates clockwise and opens relative to the second casing 3, while in midway toward an opening angle of 90 degrees, another counterclockwise rotation is also possible in order to assure the original closed state again. FIGS. 20A and 20B show the operation in which the first casing 2 rotates clockwise and opens relative to the second casing 3 from 0 degree, as described above.

Figure 21A:
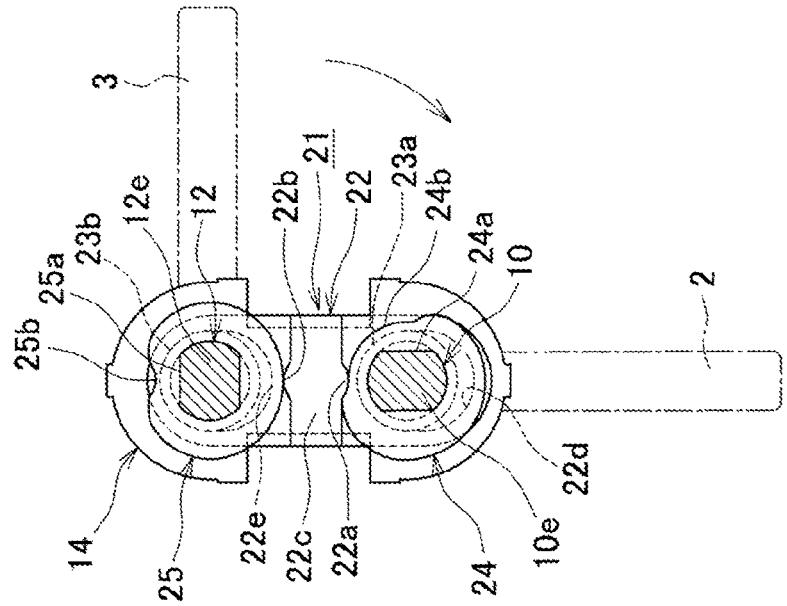
FIGS. 21A and 21B show a state when a biaxial hinge according to the invention is in operation, i.e. when a second casing is found at 90 degrees relative to a first casing, in particular FIG. 21A showing a state of a first means for selectively restricting rotation and FIG. 21B a state of a second means for selectively restricting rotation.
Figure 21B:
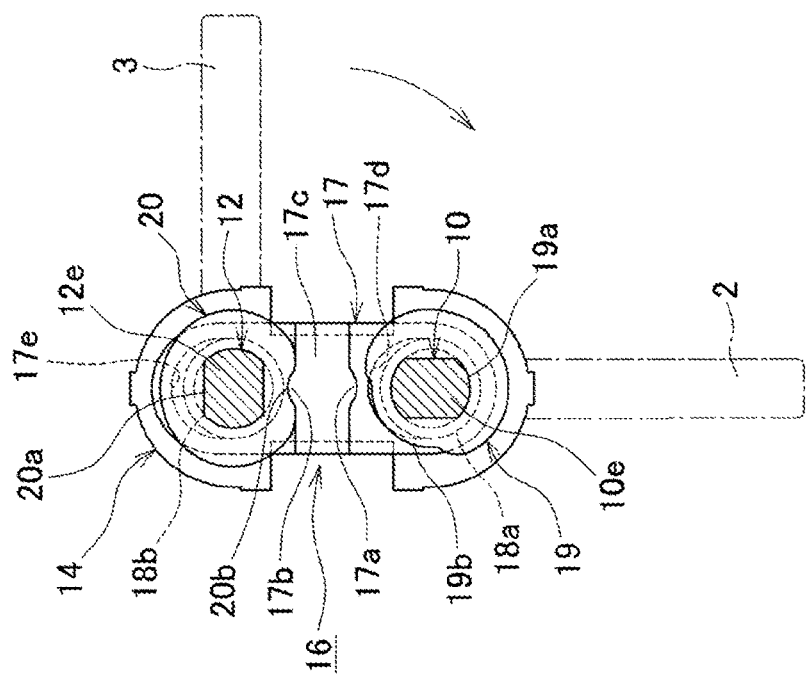
Figure 22A:
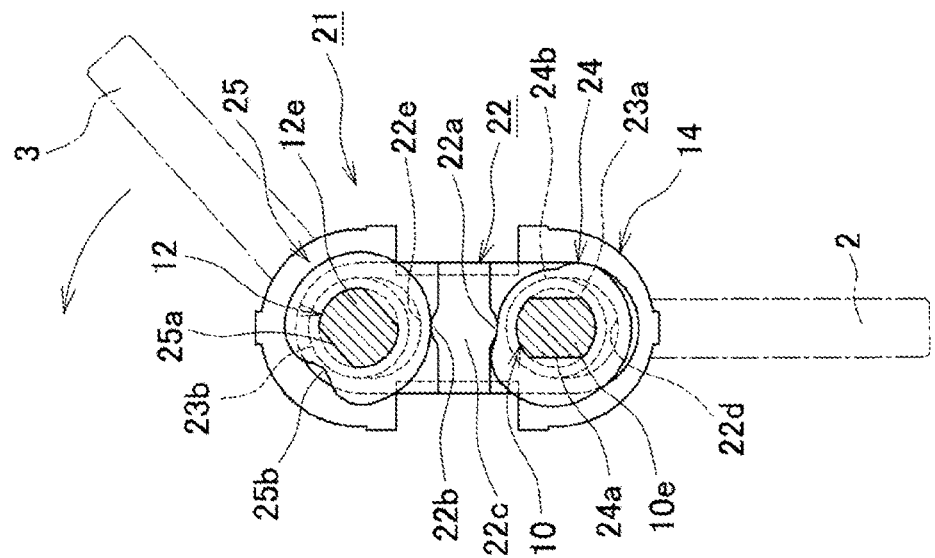
FIGS. 22A and 22B show a state when a biaxial hinge according to the invention is in operation, i.e. when a second casing is moving from 90 to 180 degrees relative to a first casing, in particular FIG. 22A showing a state of a first means for selectively restricting rotation and FIG. 22B a state of a second means for selectively restricting rotation.
Figure 22B:
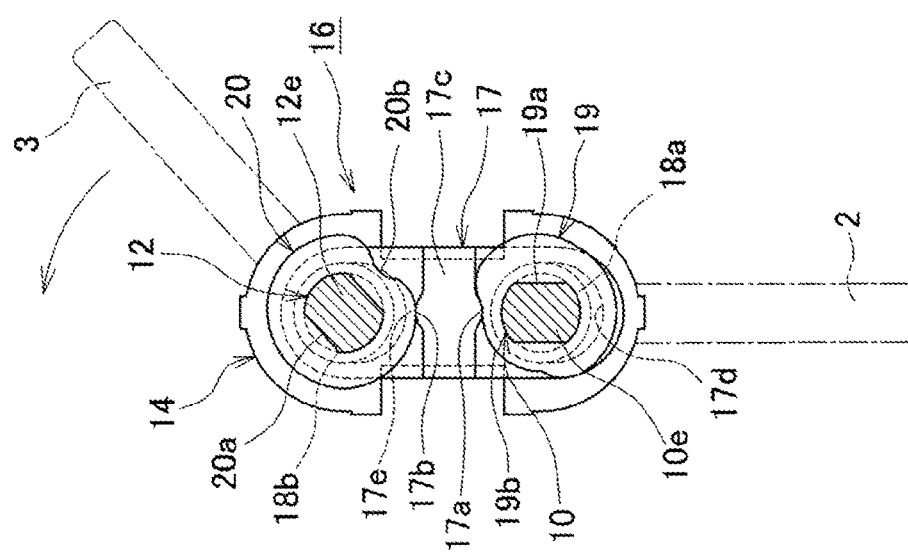

Next, once the first casing 2 has rotated clockwise and opened 90 degrees relative to the second casing 3 as shown in FIG. 21A, none of the first locking cam member 19 and the second locking cam member 20 of the first means for selectively restricting rotation 16 restricts rotation of any of the first hinge shaft 10 and the second hinge shaft 12. However, as shown in FIG. 21B, the third convex portion 22a of the second locking portion 22c of the second slide plate 22 of the second means for selectively restricting rotation 21 falls into the second curved concave portion 24b of the third locking cam member 24, and the fourth convex portion 22b abuts against the outer circumference of the fourth locking cam member 25, so that the second casing 3 rotates counterclockwise and opens relative to the first casing 2. FIGS. 22A and 22B show the operation in which the second casing 3 rotates counterclockwise and opens relative to the first casing 2 from 90 degrees, as described above.

Figure 23A:
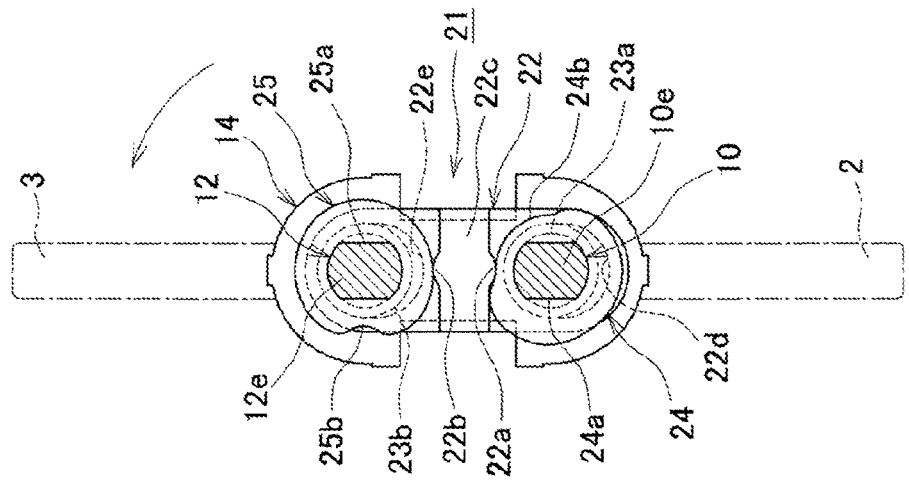
FIGS. 23A and 23B show a state when a biaxial hinge according to the invention is in operation, i.e. when a second casing is found at 180 degrees relative to a first casing, therefore the state in which the former has further rotated 90 degrees relative to the latter in a counterclockwise direction, as compared to the state in FIG. 21; in particular FIG. 23A showing a state of a first means for selectively restricting rotation and FIG. 23B a state of a second means for selectively restricting rotation.
Figure 23B:
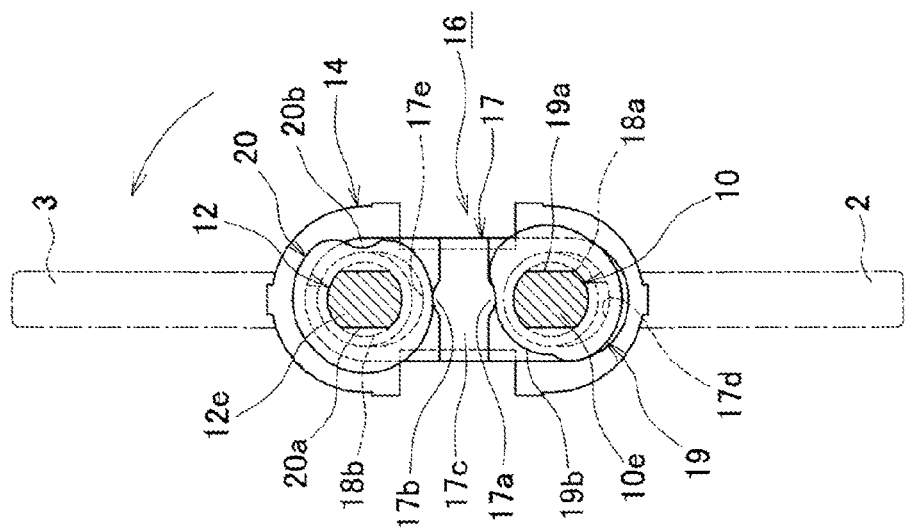

Next, FIGS. 23A and 23B show how the second casing 3 has rotated another 90 degrees counterclockwise relative to the first casing 2, so that the former is opened 180 degrees in total relative to the latter. The drawings show that the second casing 3 and the first casing 2 are found in an unfolded state, in which the second casing 3 and the first casing 2 are fully unfolded such that both casings are arranged side by side to form as a whole a non-stepped and flat tablet. And then, as shown in FIG. 23A, the first convex portion 17a of the first locking portion 17c provided on the first slide plate 17 of the first means for selectively restricting rotation 16 falls into the first curved concave portion 19b of the first locking cam member 19, and the second convex portion 17b abuts against the outer circumference of the second locking cam member 20. On the other hand, as shown in FIG. 23B, the third convex portion 22a of the second locking portion 22c of the second slide plate 22 of the second means for selectively restricting rotation 21 falls into the second curved concave portion 24b of the third locking cam member 24, and the fourth convex portion 22b is in contact with the outer circumference of the fourth locking cam member 25. Accordingly, both a clockwise and a counterclockwise rotations of the first hinge shaft 10 are restricted, but both a clockwise and a counterclockwise rotation of the second hinge shaft 12 are allowed, so that the second casing 3 can further rotate counterclockwise and open relative to the first casing 2. Still further, the second casing 3 can rotate clockwise, i.e. in a closing direction relative to the first casing 2. FIGS. 24A and 24B show how the second casing 3 further counterclockwise rotates from 180 degrees and opens relative to the first casing 2.

Figure 25A:
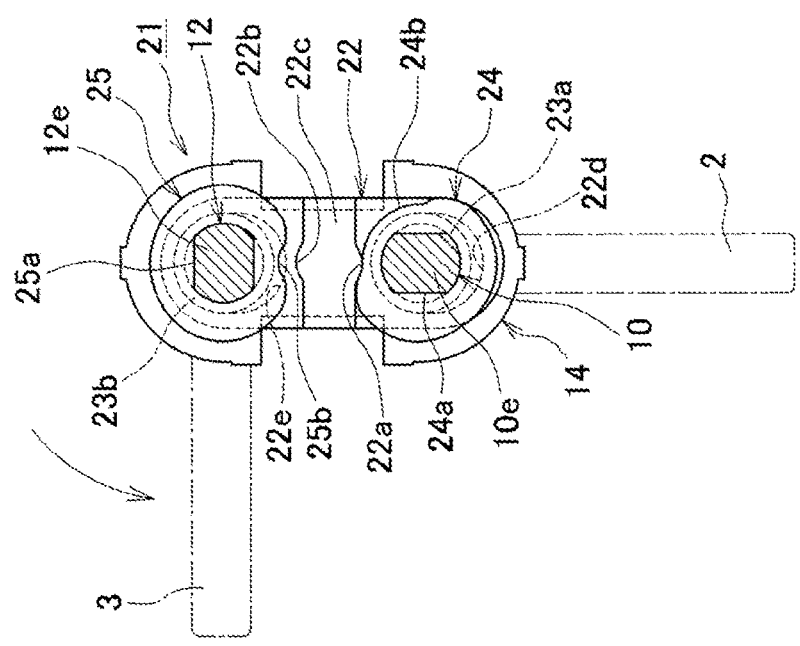
FIGS. 25A and 25B show a state when a biaxial hinge according to the invention is in operation, i.e. when a second casing is found at 270 degrees relative to a first casing, in particular FIG. 25A showing a state of a first means for selectively restricting rotation and FIG. 25B a state of a second means for selectively restricting rotation.
Figure 25B:
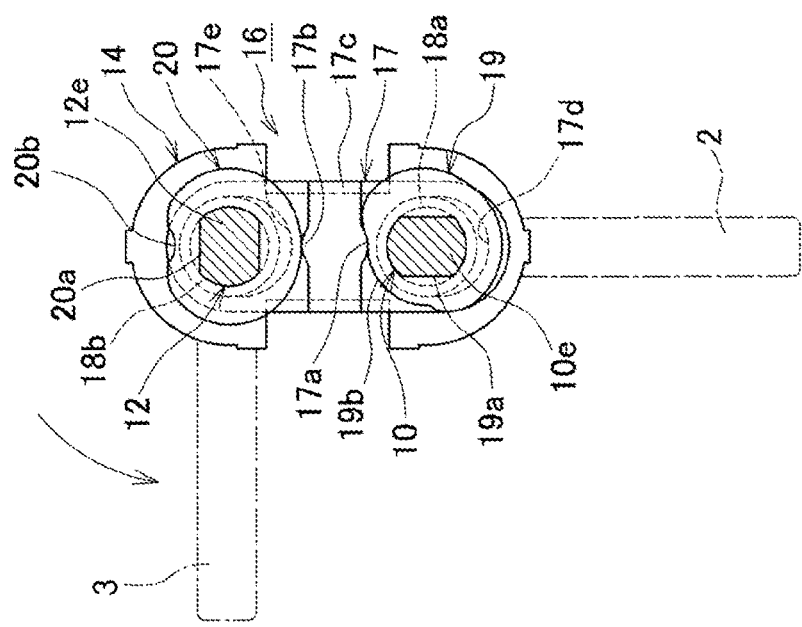

Next, FIGS. 25A and 25B show how the second casing 3 has rotated counterclockwise to the first casing 2, so that the former is opened 270 degrees in total relative to the latter. In this state, as shown in FIG. 25A, the first curved concave portion 19b of the first locking cam member 19 (attached to the first hinge shaft 10) of the first means for selectively restricting rotation 16 falls onto the first convex portion 17a of the first locking portion 17c provided on the first slide plate 17 to engage with the latter, and the outer circumference of the second locking cam member 20 (attached to the second hinge shaft 12) abuts against the second convex portion 17b, so that a clockwise rotation of the first hinge shaft 10, as well as a clockwise and a counterclockwise rotations of the second hinge shaft 12 are allowed. On the other hand, as shown in FIG. 25B, the third convex portion 22a of the second slide plate 22 falls into the second curved concave portion 24b of the third locking cam member 24 (attached to the first hinge shaft 10) of the second means for selectively restricting rotation 21 to engage with the latter, and there exists a gap between the second concave portion 25b of the fourth locking cam member 25 (attached to the second hinge shaft 12) and the fourth convex portion 22b. Accordingly, a clockwise rotation of the first hinge shaft 10 is possible in the above-mentioned opened state of 270 degrees. Moreover, clockwise and counterclockwise rotations of the second hinge shaft 12 are possible, however, the second projection 12h (provided on the second hinge shaft) of the second stopper means 9b of the stopper means 9 abuts against the second stopper piece 14d of the stopper plate (first joint member) 14 to restrict a further counterclockwise rotation of the second hinge shaft 12, so that the second casing 3 can rotate clockwise, i.e. in a closing direction, while a counterclockwise rotation of the second casing 3 in an opening direction is restricted. Therefore, only the first hinge shaft 10 can rotate clockwise, thus the first casing 2 can rotate clockwise and open relative to the second casing 3 further in an opening direction. FIGS. 26A and 26B show how the first casing 2 further opens from 270 degrees relative to the second casing 3.

Figure 27A:
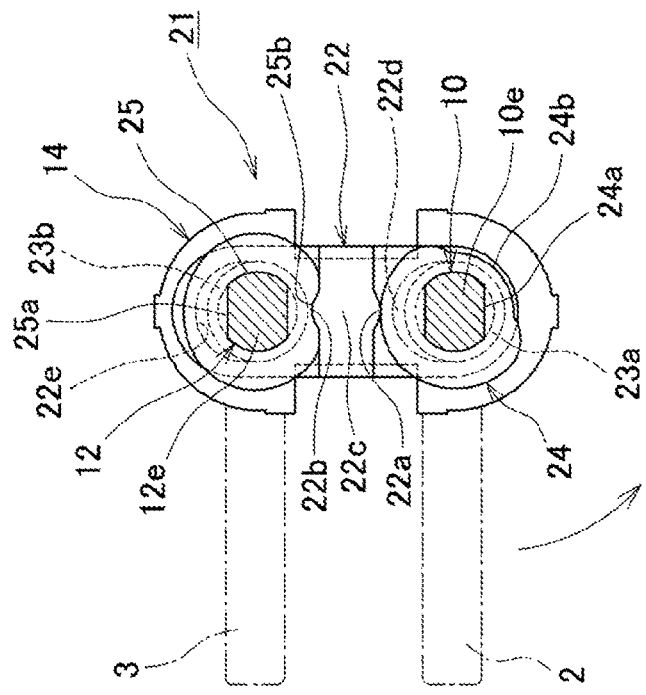
FIGS. 27A and 27B show a state when a biaxial hinge according to the invention is in operation, i.e. when a second casing is found at 360 degrees relative to a first casing, therefore the state in which the former has further rotated 90 degrees relative to the latter, as compared to the state in FIG. 25; in particular FIG. 27A showing a state of a first means for selectively restricting rotation and FIG. 27B a state of a second means for selectively restricting rotation.
Figure 27B:
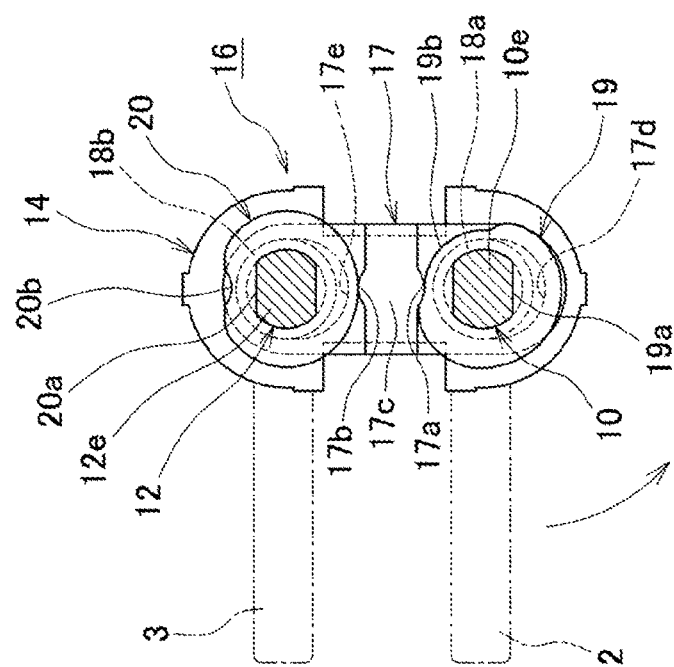

Next, FIGS. 27A and 27B show how the first casing 2 has rotated clockwise relative to the second casing 3, so that the former is opened 360 degrees in total relative to the latter. Still further, the first A curved cam convex portion 32b and the first B curved cam convex portion 32c provided on the first cam follower 32 of the first means for sucking 31a of the means for sucking 31 fall into the first A curved cam concave portion 30c and the first B curved cam concave portion 30*d* slightly before an opening angle of 360 degrees, so that the first casing 2 automatically opens relative to the second casing 3 to reach the opening angle of 360 degrees. Alternatively, the first means for sucking 31*a* can be also constructed such that it starts the above-mentioned operation while the first casing 2 closes relative to the second casing 3 from 90 to 0 degrees. Or otherwise, both the above-mentioned measures can be taken at the same time. In addition, the means for sucking 31 prevents the first casing 2 from unintentionally opening relative to the second casing 3 in the closed state of the first casing 2 and the second casing 3 and ensures that the first casing 2 is closed relative to the second casing 3, even without mean for latching between both casings. Still further, for the purpose of preventing an unintentional opening, the means for sucking 31 needs only to assure a position on the first hinge shaft 10 side, since the first hinge shaft 10 exclusively rotates, when the first casing 2 opens and closes relative to the second casing 3 in a range from 0 to 90 degrees as well as from 270 to 360 degrees.

Still further, as shown in FIGS. 27A and 27B, the first casing 2 overlaps the second casing 3, with the respective surfaces opposite to the ones facing in the closed state facing each other, in the state in which the first casing 2 is opened 360 degrees in total relative to the second casing 3 as above mentioned. In this state, as per the first hinge shaft 10, the first stopper piece 14*c* of the first joint member (stopper plate) 14 of the stopper means 9 abuts against the first projection 10*h* of the first hinge shaft, as shown in FIG. 18B, so that a further clockwise rotation of the first hinge shaft 10 is restricted.

Still further, as shown in FIG. 27A, the first curved concave portion 19*b* of the first locking cam member 19 (attached to the first hinge shaft 10) of the first means for selectively restricting rotation 16 falls onto the first convex portion 17*a* of the first locking portion 17*c* of the first slide plate 17 to engage with the latter, and the outer circumference of the second locking cam member 20 (attached to the second hinge shaft 12) abuts against the second convex portion 17*b* in the above mentioned state. In addition, as shown in FIG. 27B, the third convex portion 22*a* of the second slide plate 22 abuts against an outer circumference of the third locking cam member 24, and the second concave portion 25*b* of the fourth locking cam member 25 falls onto the fourth convex portion 22*b*. In this manner, a counterclockwise rotation of the first hinge shaft 10 is allowed, thus the first casing 2 can rotate only in a closing direction.

As explained in the foregoing, the first casing 2 and the second casing 3 open relative to each other from the closed state of 0 degree, in which both casings overlap each other, in the following manner: first, the first casing 2 opens in a clockwise direction relative to the second casing 3 up to 90 degrees; next, the second casing 3 opens in a counterclockwise direction relative to the first casing 2 up to 270 degrees; and then, from 270 degrees, the first casing 2 opens in a clockwise direction relative to the second casing 3. In this manner, the stroke in this opening operation amounts to 360 degrees, thus the first casing 2 is finally opened 360 degrees relative to the second casing 3.

Next, when the first casing 2 rotates relative to the second casing 3 from 360 degrees, at which both casings are opened to overlap each other, to close and finally reach 90 degrees from the initial position, the first means for selectively restricting rotation 16 restricts a counterclockwise rotation of the first hinge shaft 10, while the stopper means 9 and the second means for selectively restricting rotation 21 allow a clockwise rotation of the second hinge shaft 12. In this manner, the second casing 3 can rotate clockwise to close relative to the first casing 2.

FIGS. 23A and 23B show how the second casing 3 rotates 90 degrees clockwise relative to the first casing 2, in order to reach 180 degrees in total from an initial position of the closing operation. In this state, as shown in FIG. 23A, the first means for selectively restricting rotation 16 restricts a counterclockwise rotation of the first hinge shaft 10, but the stopper means 9 and the second means for selectively restricting rotation 21 allow a further clockwise rotation of the second hinge shaft 12. In this manner, the second casing 3 can further rotate clockwise to close relative to the first casing 2.

FIGS. 21A and 21B show how the second casing 3 has further rotated 90 degrees relative to the first casing 2. According to these views of FIGS. 21A and 21B, it seems that the second hinge shaft 12 can further rotate clockwise, but the stopper means 9 restricts a further clockwise rotation of the second hinge shaft 12. On the other hand, the first means for selectively restricting rotation 16 allows a counterclockwise rotation of the first hinge shaft 10, so that the first casing 2 can further rotate counterclockwise to close relative to the second casing 3. In this manner, the first casing finally overlaps the second casing 3, which means a completion of the closing operation. Therefore, the first casing 2 and the second casing 3 return to their original position.

As explained in detail in the foregoing, the first casing and the second casing 3 open and close in a prescribed sequence.

The first casing 2 and the second casing 3 relatively open and close as explained in the foregoing, and during such operations, the first means for generating friction torque 26*a* and the second means for generating friction torque 26*b* of the means for generating friction torque 26 respectively take effect, when the first hinge shaft 10 and the second hinge shaft 12 rotate one after the other. Therefore, the means for generating friction torque generates an appropriate friction torque between the first friction washer 28 and the second friction washer 29 on one hand and the first friction portion 27*d* and the second friction portion 27*e* of the third joint member 27 on the other, as well as between the friction washers on one hand and the third friction portion 30*h* and the fourth friction portion 30*i* of the fourth joint member 30 on the other. In this manner, the means for generating friction torque performs an action of stably stopping the first casing 2 and the second casing 3 at any angle, while the casings open and close.

Furthermore, as described in the foregoing and as shown in FIGS. 18A and 18B, as per the stopper means 9, its first stopper means 9*a* restricts a further rotation of the first hinge shaft 10, when the latter has rotated 180 degrees in total, by an abutment of the first projection 10*h* against the first stopper piece 14*c* provided on the stopper plate 14 also functioning as the first joint member. The second stopper means 9*b* restricts a further rotation of the second hinge shaft 12, when the latter has rotated 180 degrees in total, by an abutment of the second projection 12*h* against the second stopper piece 14*d* provided on the first joint member (stopper plate) 14.

Still further, as per the means for sucking 31, its second means for sucking 31*b* takes effect, when the second casing 3 opens from 90 to 270 degrees, namely the second A curved cam convex portion 33*b* and the second B curved cam convex portion 33*c* of the second cam follower 33 respectively fall into the second A curved cam concave portion 30*e* and the second B curved cam concave portion 30*f* of the fourth joint member 30 slightly before an opening and closing angle of 270 degrees, so that the second means for sucking performs a sucking action and urges the second casing 3 to automatically rotate relative to the first casing 2 in an opening direction. This sucking action of the second means for sucking 31b also takes effect, when the second casing 3 closes from 270 to 90 degrees.

Still further, the first means for sucking 31a of the means for sucking 31 works, when the first casing 2 opens from 270 to 360 degrees, namely the first A curved cam convex portion 32b and the first B curved cam convex portion 32c of the first cam follower 32 respectively fall into the first A curved cam concave portion 30c and the first B curved cam concave portion 30d of the fourth joint member 30 slightly before an angle of 360 degrees, so that the second means for sucking performs a sucking action and urges the first casing 2 to automatically rotate relative to the second casing 3 in an opening direction. This sucking action of the first means for sucking 31a also takes effect, when the first casing 2 closes from 90 to 0 degrees.

Accordingly, as is evident from what is explained above, the biaxial hinge 4 according to the present invention enables an opening and closing of the first casing 2 and the second casing 3 in 360 degrees range, by allowing each of the first and second casings to rotate 180 degrees, one casing rotating after the other casing in a prescribed sequence. However, the sequence of the opening and closing is not particularly limited.

Further in addition to the original application of the notebook PC 1, a variety of additional applications is also available, namely the ones of folding the first casing 2 relative to the second casing 3 into the shape substantially of the letter L, and into the angle shape, as well as of allowing the both casings to overlap each other to form a flat tablet and turning the second casing 3 to the operator, such that the notebook PC has a function as a tablet PC.

In the meantime, the first and the second disc springs 35, 36 used for the elastic means 34 can be replaced with spring washers, compression coil springs and elastic materials made of synthetic resin such as rubber. Still further, even without the hinge cases 6, 8, the function of the biaxial hinges 4, 5 is not impaired, but the hinge cases 6, 8 in use have an advantage that the biaxial hinges 4, 5 as attached to the notebook PC 1 have a neat appearance, since the hinge cases prevent the stopper means 9, the first and the second means for selectively restricting rotation 16, 21, the means for generating friction torque 26 and means for sucking 31 from an exposure to the outside.

The present invention is constructed as described above, so that it is suitable for use in a terminal device such as a notebook PC and others, wherein a first casing and a second casing open in a prescribed sequence, and both casings open and close relative to each other in a range of 360 degrees. The present invention is particularly suitable for use in a notebook PC also functioning as a tablet PC.

While a specific embodiment of the invention has been shown and described in detail to illustrate the application of the principles of the invention, it will be understood that the invention may be embodied otherwise without departing from such principles.

What is claimed is:
1. A biaxial hinge for allowing a first casing and a second casing to open and close relative to each other, said biaxial hinge comprising:

a first hinge shaft provided on said first casing being coupled in parallel to a second hinge shaft provided on said second casing, said hinge shafts being thereby respectively rotatable;

a first means for selectively restricting rotation and a second means for selectively restricting rotation being provided between said first hinge shaft and said second hinge shaft, said hinge shafts being thereby selectively rotatable;

said first means for selectively restricting rotation comprising, a first slide plate comprising a first locking portion movably provided in a radial direction of said first hinge shaft and said second hinge shaft, said first hinge shaft and said second hinge shaft passing through said first locking portion;

a first locking cam member attached to said first hinge shaft so as to be rotatable together with said first hinge shaft, said first locking cam member engaging with said first locking portion or not, depending on a rotation angle of said first hinge shaft; and a second locking cam member attached to said second hinge shaft so as to be rotatable together with said second hinge shaft, said second locking cam member engaging with said first locking portion or not, depending on a rotation angle of said second hinge shaft;

said second means for selectively restricting rotation comprising, a second slide plate comprising a second locking portion movably provided in a radial direction of said first hinge shaft and said second hinge shaft, said first hinge shaft and said second hinge shaft passing through said second locking portion;

a third locking cam member attached to said first hinge shaft so as to be rotatable together with said first hinge shaft, said third locking cam member engaging with said second locking portion or not, depending on a rotation angle of said second hinge shaft;

a fourth locking cam member attached to said second hinge shaft so as to be rotatable together with said second hinge shaft, said fourth locking cam member engaging with said second locking portion or not, depending on a rotation angle of said second hinge shaft; and a stopper means consisting of a first stopper means and a second stopper means, said first stopper means comprising:

a first A bearing hole provided in a lower position of a stopper plate also functioning as a first joint member, said first hinge shaft passing through said first A bearing hole, said first hinge shaft being thereby rotatable, a first stopper piece provided on the outside of said first A bearing hole, and a first projection provided on said first hinge shaft, said first projection abutting against said first stopper piece or not, depending on a rotation angle of said first hinge shaft;

said second stopper means comprising:

a first B bearing hole provided in an upper position of said stopper plate also functioning as said first joint member, said second hinge shaft passing through said first B bearing hole, said second hinge shaft being thereby rotatable, a second stopper piece provided on the outside of said first B bearing hole, and a second projection provided on said second hinge shaft, said second projection abutting against said second stopper piece or not, depending on a rotation angle of said second hinge shaft, said first hinge shaft and said second hinge shaft being rotatable by said first means for selectively restricting rotation and said second means for selectively restricting rotation in a specific sequence, thus said first casing and said second casing being thereby openable and closable from 0 degree in a closed state to from 360 degrees in a fully opened state by alternately rotating said first hinge shaft and said second hinge shaft 180 degrees in opposite directions.

2. The biaxial hinge according to claim 1, comprising a means for generating friction torque consisting of a first means for generating friction torque and a second means for generating friction torque;

said first means for generating friction torque comprising, a first friction portion provided at the periphery of one lateral side of a third A bearing hole, said first hinge shaft rotatably passing through said third A bearing hole in a lower position of a third joint member;

a first friction washer provided next to said first friction portion, a rotation of said first friction washer being restricted by said first hinge shaft;

a second friction portion provided at the periphery of one lateral side of a fourth A bearing hole, said first hinge shaft rotatably passing through said fourth A bearing hole in a lower position of a fourth joint member;

said second means for generating friction torque comprising, a third friction portion provided at the periphery of one lateral side of a third B bearing hole, said second hinge shaft passing through said third B bearing hole in an upper position of a third joint member;

a second friction washer provided next to said third friction portion, a rotation of said second friction washer being restricted by said second hinge shaft; and a fourth friction portion provided at the periphery of one lateral side of a fourth B bearing hole, said first hinge shaft passing through said fourth B bearing hole in an upper position of a fourth joint member.

3. The biaxial hinge according to claim 1, comprising a means for sucking consisting of a first means for sucking and a second means for sucking, said first means for sucking comprising, a first A curved cam concave portion provided at the periphery of other lateral side of said fourth A bearing hole of said fourth joint member, said first hinge shaft rotatably passing through said fourth A bearing hole, a first B curved cam concave portion provided at the periphery of other lateral side of the fourth A bearing hole of the fourth joint member, said first hinge shaft rotatably passing through said fourth A bearing hole, a first cam follower comprising a first A curved cam convex portion and a first B curved cam convex portion on a side facing said first A curved cam concave portion and said first B curved cam concave portion, a rotation of said first cam follower being restricted by said first hinge shaft and said first cam follower being thereby attached to said first hinge shaft, and a first elastic means for bringing said first A curved cam concave portion and said first B curved cam concave portion into a pressurized contact with said first A curved cam convex portion and said first B curved cam convex portion, said second means for sucking comprising, a second A curved cam concave portion provided at the periphery of other lateral side of said fourth B bearing hole of said fourth joint member, said second hinge shaft rotatably passing through said fourth A bearing hole, a second B curved cam concave portion provided at the periphery of other lateral side of the fourth B bearing hole of the fourth joint member, said second hinge shaft rotatably passing through said fourth A bearing hole, a second cam follower comprising a second A curved cam convex portion and a second B curved cam convex portion on a side facing said second A curved cam concave portion and said second B curved cam concave portion, a rotation of said second cam follower being restricted by said second hinge shaft and said second cam follower being thereby attached to said second hinge shaft, and a first elastic means for bringing said second A curved cam concave portion and said second B curved cam concave portion into a pressurized contact with said first A curved cam convex portion and said first B curved cam convex portion.

4. The biaxial hinge according to claim 1, comprising a hinge case for covering a main body part extending from a stopper plate also functioning as a first joint member, said hinge case comprising an attaching portion provided in the interior thereof, said attaching portion being detachably attached to said main body part via an attaching shaft.

5. The biaxial hinge according to claim 1, comprising a hinge case for covering a main body part extending from a stopper plate also functioning as a first joint member, said hinge case comprising an attaching portion provided in the interior thereof, said attaching portion being detachably attached to said main body part via an attaching shaft, and one end portion of said attaching shaft being attached to a joint member of said means for generating friction torque of said main body part, and other end portion of said attaching shaft being attached to said attaching portion of said hinge case.

6. A notebook PC, comprising the biaxial hinge according to claim 1.

* * * * *